United States Patent [19]
Burke et al.

[11] Patent Number: 6,134,223
[45] Date of Patent: *Oct. 17, 2000

[54] VIDEOPHONE APPARATUS, METHOD AND SYSTEM FOR AUDIO AND VIDEO CONFERENCING AND TELEPHONY

[75] Inventors: Timothy M. Burke, Algonquin; Douglas J. Newlin, Geneva, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/715,887

[22] Filed: Sep. 18, 1996

[51] Int. Cl.$^7$ .................................................. H04Q 11/00
[52] U.S. Cl. ........................ 370/265; 348/15; 379/202
[58] Field of Search ...................... 370/260, 261, 370/263, 265, 266, 267, 268, 269, 270, 271, 463; 348/15, 423; 379/202, 206

[56] References Cited

U.S. PATENT DOCUMENTS

| | | |
|---|---|---|
| 4,847,829 | 7/1989 | Tompkins et al. .......................... 348/15 |
| 4,995,071 | 2/1991 | Weber et al. ............................ 370/260 |
| 5,042,062 | 8/1991 | Lee et al. . | 
| 5,343,240 | 8/1994 | Yu . |
| 5,371,534 | 12/1994 | Dagdeviren et al. . |
| 5,534,914 | 7/1996 | Flohr et al. ............................... 348/15 |
| 5,627,825 | 5/1997 | Barraclough et al. ................... 370/260 |
| 5,675,375 | 10/1997 | Riffee ........................................ 348/15 |

*Primary Examiner*—Chau Nguyen
*Assistant Examiner*—Soon-Dong Hyun
*Attorney, Agent, or Firm*—Hugh C. Dunlop; Romi N. Bose

[57] ABSTRACT

A video access apparatus (110, 150, 750, 850) provides for audio and video teleconferencing and telephony via a first communication channel (103) coupled to a primary station (105) having communication with a network (140), such as the public switched telephone network or an ISDN network. The video access apparatus (110) includes a video network interface (210); a radio frequency modulator/demodulator (205); a user interface (215); and a processor arrangement (190). A videophone apparatus (700, 800) is coupleable to a video access apparatus via a second communication channel for video reception and transmission, and via a third communication channel for audio reception and transmission. The videophone apparatus includes a video monitor (715), a camera interface (235), a video camera (720), and a telephony module (710). Multiple videophone apparatuses (700, 800) may be used simultaneously, and multiple video signals from the videophone apparatuses (700, 800) may be multiplexed and combined into one composite video signal for transmission to the network (140).

14 Claims, 12 Drawing Sheets

VIDEOPHONE APPARATUS, METHOD AND SYSTEM FOR AUDIO AND VIDEO CONFERENCING AND TELEPHONY

CROSS-REFERENCE TO RELATED APPLICATIONS

This application is related to a pending first application, Newlin et al., U.S. patent application Ser. No. 08/658,792, filed Jun. 5, 1996, entitled "Audio/Visual Communication System and Method Thereof", (the "first related application"); and is related to a pending second application, Burke et al., U.S. patent application Ser. No. 08/706,100, filed Aug. 30, 1996, entitled "Apparatus, Method And System For Audio And Video Conferencing And Telephony", (the "second related application"); both incorporated by reference herein, with priority claimed for all commonly disclosed subject matter.

FIELD OF THE INVENTION

This invention relates in general to audio and video communications systems and, more specifically, to an apparatus, method and system for audio and video conferencing and telephony.

BACKGROUND OF THE INVENTION

Currently, audio and video (visual) conferencing capabilities are implemented as computer based systems, such as in personal computers ("PCs"), as stand-alone, "roll about" room systems, and as videophones. These systems typically require new and significant hardware, software and programming, plus require significant communications network connections, for example, multiple channels of an Integrated Services Digital Network ("ISDN") connection or a T1/E1 connection.

For example, stand-alone, "roll about" room systems for audio and video conferencing typically require dedicated hardware at significant expense, in the tens of thousands of dollars, utilizing dedicated video cameras, television displays, microphone systems, and the additional video conferencing equipment. Such systems may also require as many as six (or more) contiguous ISDN B channels (or T1/E1 DS0s), each operating at 64 kbps (kilobits per second). PC based systems also typically require, at a minimum, ISDN basic rate interface service, consisting of 2 ISDN B channels (each operating at 64 kbps) plus one D channel (operating at 16 kbps). Such communication network capability is also expensive and potentially unnecessary, particularly when the additional channels are not in continuous use.

Current audio/visual telephony or conferencing systems are also limited to providing such audio/visual functionality only at designated nodes, i.e., the specific system location, and are neither mobile nor distributed (having multiple locations). Stand-alone, "roll about" room systems allow such audio and video conferencing only within or at that particular physical location. Video phones are also currently limited to their installed locations. Similarly, PC based systems provide such functionality only at the given PC having the necessary network connections (such as ISDN) and having the specified audio/visual conferencing equipment, such as a video camera, microphone, and the additional computer processing boards which provide for the audio/visual processing . For other PCs to become capable of such audio/visual conferencing functionality, they must also be equipped with any necessary hardware, software, programming and network connections.

Such conventional audio/visual conferencing systems are also difficult to assemble, install, and use. For example, the addition of audio/visual functionality to a PC requires the addition of a new PC card, camera, microphone, the installation of audio/visual control software, and the installation of new network connections, such as ISDN. In addition, such network connectivity may require additional programming of the PC with necessary ISDN specific configuration information, such as configuration information specific to the central office switch type of the service provider and ISDN service profile identifier (SPID) information. Video conference call set up procedures typically are also difficult and complicated utilizing these current systems.

Conventional audio/visual telephony and conferencing equipment is also limited to communication with similar equipment at the far end (remote location). For example, videophone systems which utilize typical telephone systems ("POTS"—plain old telephone service) transmit information in analog form, for example, as trellis code modulated data, at V.34 and V.34 bis rates (e.g., highest rates of approximately 28.8 to 33 kbps). Such POTS-based videophone systems would not be compatible with ISDN audio/visual conferencing and telephony systems which transmit information in digital form, such as utilizing Q.931 message signaling, Q.921 LAPD datalink, and Q.910 physical interface digital protocols, with data rates of 128 kbps (two B channels) or more with additional channels or DS0s.

In addition, such current audio/visual telephony and conferencing equipment are relatively expensive and, in most instances, sufficiently expensive to be prohibitive for in-home or other consumer use. For example, the cost of roll about, room based systems is typically tens of thousands of dollars. PC based videoconferencing systems, with ISDN network connections, are also expensive, with costs in the thousands of dollars.

Current audio/visual telephony and conferencing equipment also do not provide for multiple, simultaneous video conferences from more than one location. For example, current systems (such as those in PCs) do not provide for multiplexed video conference sessions, in which the output video may include display of video input from several video cameras at multiple locations.

Accordingly, a need has remained for audio/visual conferencing and telephony systems, equipment, and methods which may operate at more than one designated node or location within the user premises, or may be mobile, or may be configured as needed for additional locations. Such a system should be compatible for use with other existing video conferencing systems, should be user friendly, easy to install and use, and should be relatively less expensive for in-home purchase and use by consumers. In addition, such a system should be able to provide multiple video conferencing sessions which may originate from multiple locations.

DETAILED DESCRIPTION OF THE INVENTION

As disclosed in the second related application, and as illustrated in FIGS. 1 through 12, the preferred embodiment of the invention disclosed in the second related application provides for audio and visual conferencing and telephony capability at one or more locations within the user premises, may be mobile, and may be configured as needed for additional locations. In addition, in accordance with the preferred embodiment disclosed in the second related application, the audio/visual conferencing and telephony system utilizes equipment typically found in consumers' homes or premises, such as existing televisions, video cameras or camcorders, and telephones. In addition, such a system is designed to be compatible for use with other existing video conferencing systems, may be utilized over a variety of connected telecommunications networks (such as ISDN or POTS), is user friendly, easy to install and use, and should be relatively less expensive for in-home purchase and use by consumers.

As mentioned above, a need has also remained for audio/visual telephony and conferencing equipment to provide for multiple, simultaneous video conferences from more than one location. In accordance with the preferred embodiment of the present invention, multiple, simultaneous video conferences from more than one location may occur, providing for multiplexed video conference sessions, in which the output video may include display of video input from several video cameras at multiple locations. In addition, in accordance with the present invention, various videophone apparatus embodiments are disclosed, which provide an alternative to the use of telephones, video cameras and televisions as utilized and disclosed in the invention of the second related application. The various videophone apparatus embodiments in accordance with the present invention are also compatible for use with other existing video conferencing systems, may be utilized over a variety of connected telecommunications networks (such as ISDN or POTS), are user friendly, easy to install and use, and also should be relatively less expensive for in-home purchase and use by consumers.

Figure 1:
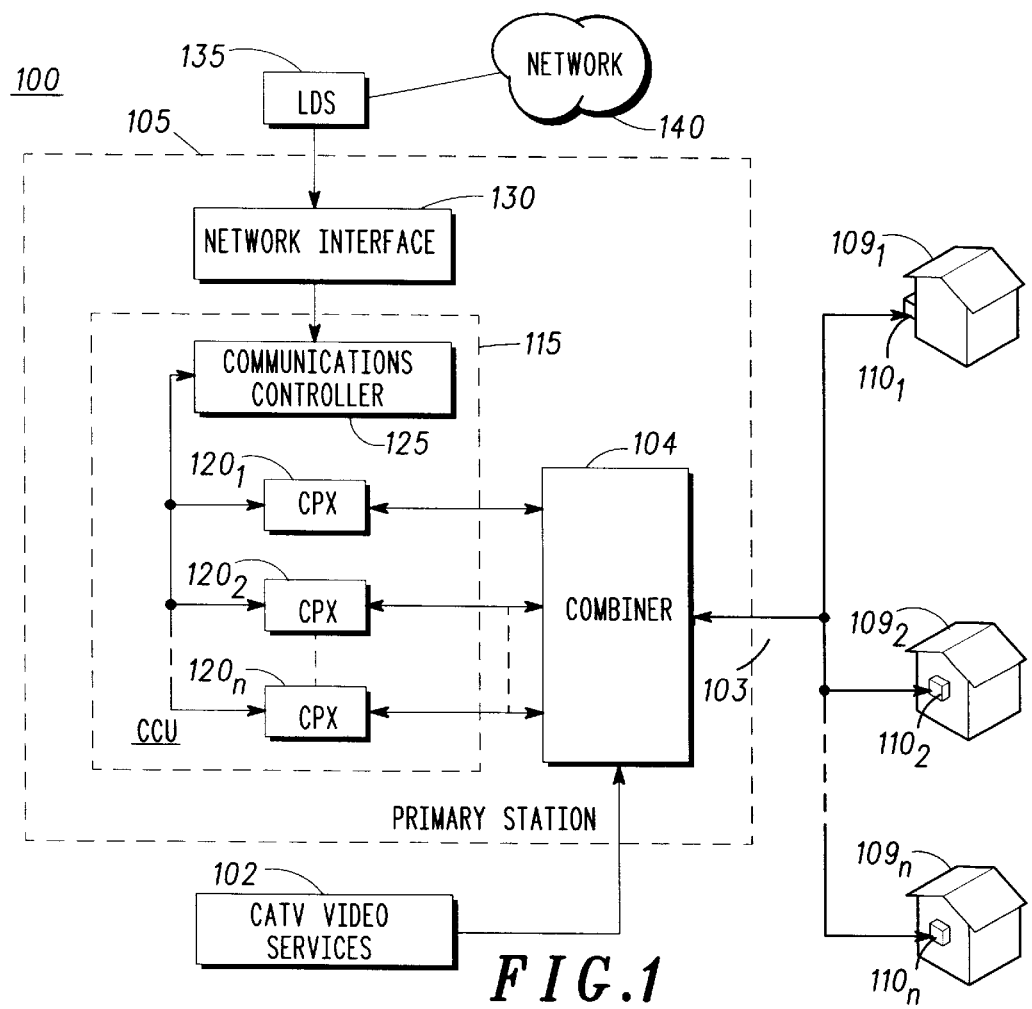
FIG. 1 is a block diagram illustrating an audio/video network configuration for a video access apparatus in accordance with the present invention.
Figure 2:
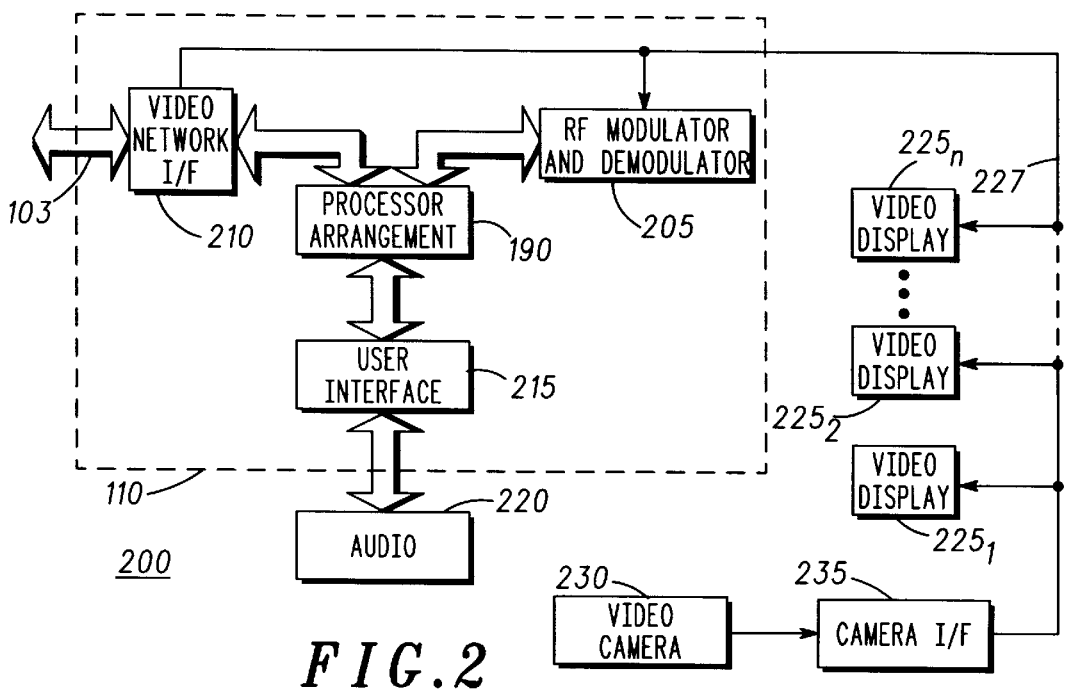
FIG. 2 is a high level block diagram illustrating a first embodiment of a video access apparatus and a first embodiment of a video conferencing system of the invention disclosed in the second related application.

FIG. 1 is a block diagram illustrating a configuration of an audio/video network 100 for a video access apparatus 110 in accordance with the invention disclosed in the second related application. As illustrated in FIG. 1, video access apparatus $110_1$ through video access apparatus $110_n$ (individually and collectively referred to as a video access apparatus(es) 110) may have an outdoor location, for example, at subscriber premises $109_1$ (video access apparatus $110_1$), or may have indoor locations, for example, at subscriber premises $109_2$ and $109_n$ (video access apparatus $110_1$ and video access apparatus $110_n$). The video access apparatus 110 illustrated in FIG. 1 may have a first embodiment as illustrated in FIG. 2, a second (non-multichannel and non-multiplexing) embodiment as video access apparatus 150 illustrated in FIG. 3, a third, multichannel embodiment as video access apparatus 750 illustrated in FIG. 13, or a fourth, multichannel and multiplexing embodiment as video access apparatus 850 illustrated in FIG. 16. As a consequence, as used herein, reference to any of the embodiments of the video access apparatus 110, 150, 750 or 850 shall be understood to mean and include the other apparatus embodiment or its equivalents. Referring to FIG. 1, in accordance with the invention disclosed in the second related application, the video access apparatus 110 provides audio and video telephony and conferencing services over a first communication channel 103 which, in the preferred embodiment, is hybrid fiber coaxial cable ("HFC") utilized in the audio/video network 100 (which may have multiple configurations). Also in the preferred embodiment utilizing HFC, the video access apparatus 110 (150 or 750) is also referred to as a video cable access unit. The first communication channel 103, in turn, is connected through a primary station 105 to a cable television network ("CATV") video services infrastructure 102, and through a local digital switch 135 to a network 140. The network 140, for example, may be a public switched telephone network ("PSTN") or an Integrated Services Digital Network ("ISDN"), or any combination of such existing or future telecommunications networks.

Continuing to refer to FIG. 1, a primary station 105, also referred to as head end equipment, includes a control unit referred to in the preferred embodiment as a cable control unit ("CCU") 115, a network interface (or telecommunications network interface) 130, a combiner 104, and is coupleable to the CATV video services infrastructure 102. The CCU 115 consists of a communications controller 125 and a bank of transceivers $120_1$ through $120_n$, also referred to as cable port transceiver ("CPX") cards in the preferred embodiment. The communications controller 125 transmits and receives industry standard time division multiplexed ("TDM") signals, via the network interface 130, to and from a local digital switch ("LDS") which connects to the rest of the network 140. In the preferred embodiment, incoming (received) signals to the communications controller 125 are converted to an internal signaling format, may also have TDM time slots interchanged, and are then routed to the transceivers $120_1$ through $120_n$. The transceivers $120_1$ through $120_n$ convert the received signals to frequencies (e.g, radio frequencies ("RF")), preferably frequencies compatible with cable television (CATV) networks. The primary station 105 provides concentration of the resources of the network 140 through time slot and frequency management techniques. The audio/video network 100 comprises the primary station 105 (with the network interface 130 for connection to the network 140 and the coupleability to the CATV video services infrastructure 102), along with a plurality of video access apparatuses, such as video access apparatuses $110_1$ through $110_n$ (connected to the primary station 105 over the first communication channel 103).

In the preferred embodiment, the signaling over the audio/video network 100 uses a protocol referred to as "CACS" (for Cable ACcess Signaling), for transmission and reception of data such as voice, video, computer files and programs, and other information (collectively referred to as data). CACS is a multi-layered protocol consisting of a plurality of 768 kbps Π/4-DQPSK (differential quadrature phase shift keying) modulated RF carriers using TDM framing in the downstream path (from the primary station 105 to a video access apparatus 110) and TDMA (time division multiple access) in the upstream path (to the primary station 105 from a video access apparatus 110). In the preferred embodiment, each CACS carrier supports as many as eight time slots of individually addressable user data packets, in which each packet contains 160 bits of user data (the "payload") plus address and error correction information. The preferred CACS frame rate is 400 frames per second, providing a net user data throughput of 64 kbps (kilobits per second) for each assigned time slot. Time slots also may be concatenated to provide even greater data rates, for example, up to 512 kbps when all eight time slots are assigned to a single user.

As a consequence, N×64 kbps services may be supported with the CACS protocol, where N is the number of assigned time slots. In the case of connectivity for ordinary telephony commonly known as POTS (Plain Old Telephone Service), a single time slot is used in which digital PCM (pulse code modulated) audio samples are transported in the payload of the CACS time slot. In the case of connectivity for higher rate services, such as basic rate ISDN (two 64 kbps B channels plus one 16 kbps D channel), two or more time slots are used to transport the user (bearer) data. For video conferencing and telephony service, compressed digital audio and video signals may occupy from one to multiple time slots per carrier (e.g., 8 time slots per carrier), depending on the method of compression used and the desired quality of the service, and depending upon the number of video network interfaces 210 (or CATV RF transceivers 245) utilized in the video access apparatus 110 (or 150) discussed below.

Also in the preferred embodiment, modulated CACS RF carriers occupy an RF bandwidth of 600 kHz and may be assigned anywhere within the downstream and upstream CATV frequency bands. Typically, in domestic, North American CATV systems, the downstream band has been designated from 50 to 750 MHz, with an upstream band designated from 5 to 40 MHz. Referring to FIG. 1, for transmission to the user premises $109_1$ through $109_n$, the transceivers $120_1$ through $120_n$ receive a TDM data stream from the communications controller 125 and create CACS frames of eight time slots, along with associated overhead signaling information (including error control data), resulting in a 768 kbps data stream. The data stream is then converted to a Π/4-DQPSK signal, which in turn is then upconverted in frequency from baseband to an RF carrier within the CATV downstream band. This Π/4-DQPSK signal may then be optionally combined (in the combiner 104 of the primary station 105) with other video services signals from the CATV video services infrastructure 102, and transmitted over the first communication channel 103.

At the receiving end, as discussed in greater detail below, a video access apparatus 110 downconverts the CACS carrier to baseband and demodulates the Π/4-DQPSK signal, resulting in received CACS frames. Time slot information (i.e., the data in the payload) is then extracted from the CACS frames and transferred to an audio codec in the case of telephony (a POTS call), or transferred to an audio/video compression and decompression subsystem in the case of a video conferencing call or session. Conversely, for upstream transmission, voice or video data originating, respectively, from the audio codec or an audio/video compression and decompression subsystem, is put into CACS protocol formatted TDMA data packets. The TDMA data packets are then converted into a Π/4-DQPSK signal, upconverted to an RF carrier, and injected into the upstream path of the audio/video network 100, on first communication channel 103. In turn, one of the transceivers $120_1$ through $120_n$ receives the upstream signal from a video access apparatus 110, RF downconverts the signal to baseband and demodulates the Π/4-DQPSK signal, resulting in a received TDMA data packet. The user data is then extracted from the packet and transferred to the communications controller 125, which reformats the user data into an appropriate network signal (analog or digital) and, through the network interface 130, transmits the network signal, multiplexed with other signals, to the network 140 (via the local digital switch 135).

In the preferred embodiment, the CACS protocol consists of three types of signaling channels which use designated time slots on CACS carriers. A first type of signaling channel, referred to as a broadcast channel, is utilized to transmit general system information, only in the downstream direction to the various video access apparatuses 110, and to transmit information such as terminating alerts to a video access apparatus 110 when a call is to be received from the network 140. A plurality of a second type of signaling channel, referred to as access channels, are used by the various video access apparatuses 110 to gain access to the audio/video network 100 or the network 140. A plurality of a third type of signaling channel, referred to as traffic channels, are full-duplex and are used to transport user data to and from the network 140.

In the preferred embodiment, traffic channels may consist of one or more time slots and are assigned to users based on demand (trunked) from a pool of available time slots. A traffic channel is assigned for the duration of a call (POTS or video), and upon call termination, is subsequently released to the pool of available time slots. When a video access apparatus 110 first powers up, it registers with the CCU 115 by first scanning the downstream spectrum for a CACS broadcast channel, synchronizing with that channel, and obtaining information concerning a location of an access channel. On the access channel, the video access apparatus 110 requests an assignment of a traffic channel, and then transmits a registration message over the assigned traffic channel of the plurality of traffic channels. After registration is complete, the video access apparatus 110 may make or receive calls through the network 140.

If a call origination is required, the video access apparatus 110 makes a request to the CCU 115 for the required number of time slots through the access channel. The CCU 115 then grants the request and assigns a traffic channel (carrier frequency and associated time slot(s)). If a call delivery is required, the CCU 115 alerts the identified, addressed video access apparatus 110 of an incoming call over the broadcast channel. Via the access channel, the video access apparatus 110 then requests a traffic channel. The CCU 115 grants the request and a traffic channel is assigned.

In the preferred embodiment, the CACS protocol also provides the capability for transferring calls to other available carrier frequencies and time slots, especially in the event of high noise conditions. Preferably, the quality of all user traffic channels is continuously monitored, and if the quality starts to degrade due to noise, the call is transferred to another RF carrier having less noise.

FIG. 2 is a high level block diagram illustrating a first embodiment of a video access apparatus, namely, video access apparatus 110, and illustrating a video conferencing system 200, in accordance with the invention disclosed in the second related application. The video conferencing system 200, in accordance with the invention disclosed in the second related application, includes a video access apparatus 110, audio 220, one or more video displays $225_1$ through $225_n$ (individually and collectively referred to as video display(s) 225), camera interface 235, and video camera 230. The video access apparatus 110 is coupleable to a first communication channel 103, for communication via a primary station 105 with a network 140 and with a CATV video service infrastructure 102 as discussed above, and is coupled to a second communication channel 227, typically located within or about the user (or subscriber) premises 109. For example, the second communication channel 227 may be an internal 75 Ohm coaxial cable typically utilized with cable television. The audio 220 is coupled to the video access apparatus 110, and may include a microphone and speaker or, as discussed below with reference to FIG. 3, may be preferably embodied as a telephone. One or more video displays 225 are utilized to display the incoming video portion of an audio and video conferencing call or session (incoming in the sense of having been transmitted to the video access apparatus 110 from another location), may also include a speaker for output of the incoming audio portion of an audio and video conferencing call or session, and are implemented utilizing one or more televisions in the preferred embodiment. The video camera 230 is utilized to generate the outgoing video portion of an audio and video conferencing call or session (outgoing in the sense of being transmitted from the video access apparatus 110 to another location), may also include a microphone for generation of the outgoing audio portion of an audio and video conferencing call or session, and is implemented utilizing an ordinary video camera or camcorder in the preferred embodiment. The camera interface 235 is utilized to modulate the video output signal from the video camera 230 for transmission on the second communication channel 227 to the video access apparatus 110 and, as discussed in greater detail below, the camera interface 235 also may be directly incorporated within the video camera 230.

Continuing to refer to FIG. 2, the video access apparatus 110 includes a video network interface 210, a radio frequency (RF) modulator and demodulator 205 (also referred to as an RF modulator/demodulator 205), a user interface 215, and a processor arrangement 190. The video network interface 210 is coupleable to the first communication channel 103 for reception of a first protocol signal, such as a $\pi/4$-DQPSK TDM signal, to form a received protocol signal; and for transmission of a second protocol signal, such as digital data in a TDMA format, to form a transmitted protocol signal, such as a $\pi/4$-DQPSK TDMA signal. These various protocol signals may also utilize protocols and modulation types (collectively referred to as protocols) other than those utilized within the CACS protocol such as, for example, more general PSK (phase shift keying) or QPSK (quadrature phase shift keying) modulation methods, OFDM (orthogonal frequency division multiplexing), QAM (quadrature amplitude modulation), H.320, H.323, or H.324. Also, as used herein, input and output directions are defined to avoid confusion between incoming and outgoing signals because, for example, an incoming signal to the video access apparatus 110 from the network 140 will also be an outgoing signal from the video access apparatus 110 when transmitted to a video display 225 on the second communication channel 227. As a consequence, as used herein, input and output directions are defined at the interface between the video access apparatus 110, on the one hand, and the second communication channel 227 or audio 220, on the other hand, as follows: an input signal, such as an input video or audio signal, is input to the video access apparatus 110 from the second communication channel 227 (or, in the case of input audio, from the audio 220), and may originate, for example, from the video camera 230, and will be transmitted from the video access apparatus 110 to the network 140; conversely, an output signal, such as an output video or audio signal, is output from the video access apparatus 110 to the second communication channel 227 (or, in the case of output audio, to the audio 220), and may originate, for example, from a remote location via the network 140, is received by the video access apparatus 110 via the first communication channel 103, and will be transmitted or output by the video access apparatus 110 on the second communication channel 227 to a video display 225 or output to audio 220.

Figure 3:
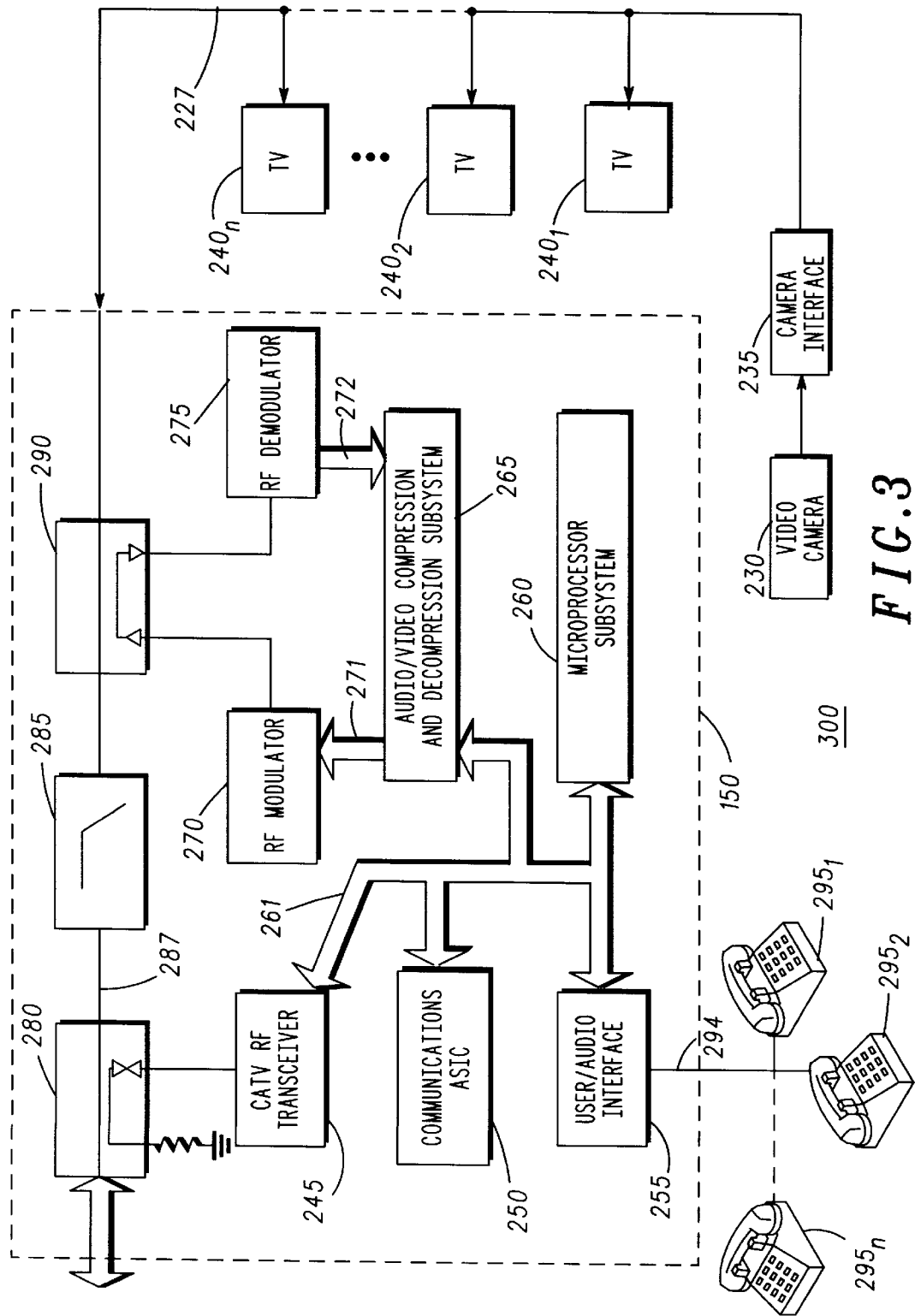
FIG. 3 is a detailed block diagram illustrating a second embodiment of a video access apparatus and a second embodiment of a video conferencing system of the invention

Continuing to refer to FIG. 2, the RF modulator and demodulator 205 is utilized to convert a baseband output video signal (from the processor arrangement 190) to a radio frequency output video signal, for transmission on the second communication channel 227 and reception by one or more of the video displays 225, and to convert a radio frequency input video signal (from the camera interface 235) to a baseband input video signal, for input to the processor arrangement 190. The user interface 215 is utilized for reception of a control signal of a plurality of control signals, such as a request to place a telephony call, a request to place an audio and video conference call, and other control signals such as alerting signals of incoming telephony or audio and video conference calls. The processor arrangement 190 is coupled to the video network interface 210, to the radio frequency modulator/demodulator 205 and to the user interface 215. As explained in greater detail below, the processor arrangement 190 may be comprised of a single integrated circuit ("IC"), or may include a plurality of integrated circuits or other components connected or grouped together, such as microprocessors, digital signal processors, ASICs, associated memory (such as RAM and ROM), and other ICs and components. As a consequence, as used herein, the term processor arrangement should be understood to equivalently mean and include a single processor, or arrangement of processors, microprocessors, controllers, or some other grouping of integrated circuits which perform the functions discussed in greater detail below. For example, in the preferred embodiment, the processor arrangement 190 is implemented as illustrated in FIG. 3, and includes a communications ASIC (application specific integrated circuit) 250, an audio/video compression and decompression subsystem 265, and a microprocessor subsystem 260. As discussed in greater detail below, the methodology of the invention disclosed in the second related application may be programmed and stored, as a set of program instructions for subsequent execution, in the processor arrangement 190 and its associated memory and other equivalent components. In the preferred embodiment, the processor arrangement 190 is utilized, in conjunction with a stored set of program instructions and in response to any control signals entered by the user or received from the network 140, first, to convert the received protocol signal (from the video network interface 210) both to a baseband output video signal (to be modulated by the RF modulator/demodulator 205 and transmitted to a video display 225) and to an output audio signal (transmitted to the audio 220 or combined with the baseband output video signal, modulated and transmitted to the video display 225); and second, to convert both a baseband input video signal (the demodulated input video signal having originated from the camera interface 235) and an input audio signal (from the audio 220 or combined with the baseband input video signal having originated from the video camera 230 and the camera interface 235), to the second protocol signal (to be modulated and transmitted by the video network interface 210 to the network 140). The functions of each of the components of the video access apparatus 110 are discussed in greater detail below with reference to FIGS. 3–10.

FIG. 3 is a high level block diagram illustrating a second embodiment of a video access apparatus, namely, video access apparatus 150, and illustrating a second embodiment of a video conferencing system 300, in accordance with the invention disclosed in the second related application. The second apparatus embodiment, namely, the video access apparatus 150 illustrated in FIG. 3, is the preferred apparatus embodiment of the invention, and is in all other respects equivalent to and may be utilized in a manner identical to the first embodiment, video access apparatus 110, illustrated in FIGS. 1 and 2. Similarly, the second embodiment of the video conferencing system, video conferencing system 300, is also the preferred system embodiment of the invention disclosed in the second related application, and is in all other respects equivalent to and may be utilized in a manner identical to the first embodiment, video conferencing system 200, illustrated in FIG. 2.

As illustrated in FIG. 3, the video access apparatus 150 includes a microprocessor subsystem 260, an audio/video compression and decompression subsystem 265, and a communications ASIC 250, which form the processor arrangement 190 discussed above with reference to FIG. 2. The video access apparatus 150 also includes a CATV radio frequency (RF) transceiver 245 (which equivalently functions as the video network interface 210 illustrated in FIG. 2), a user/audio interface 255 (which equivalently functions as the user interface 215 illustrated in FIG. 2); and an RF modulator 270 and RF demodulator 275 (which together equivalently function as the RF modulator/demodulator 205 illustrated in FIG. 2). The preferred embodiment of the video access apparatus 150 illustrated in FIG. 3 also includes a first directional coupler 280, a second directional coupler 290, and a filter 285. Also as mentioned above, when a data rate may be needed which is higher than that which may be accommodated by all available time slots per carrier, additional CATV RF transceivers 245 may also be utilized to provide additional time slots on additional carriers. The functions of each of these components is explained in greater detail below.

Also as illustrated in FIG. 3, the second embodiment of a video conferencing system 300 includes (as an audio interface) one or more telephones $295_1$ through $295_n$ (individually and collectively referred to as telephone(s) 295, and which telephones 295 equivalently function as the audio 220 illustrated in FIG. 2); the video access apparatus 150; a video camera 230; a camera interface 235 (which also may be combined or incorporated within the video camera 230); one or more televisions $240_1$ though $240_n$ (which are individually and collectively referred to as television(s) 240, and which equivalently function as the video displays 225 illustrated in FIG. 2); and a second communications channel 227 which, as mentioned above, is preferably a coaxial cable in the user (or subscriber) premises.

Referring to FIG. 3, the video access apparatus 150 provides both telephony (POTS) and audio/video conferencing service using common household appliances for interaction with the user (or subscriber) in the video conferencing system 300, such as telephones $295_1$ through $295_n$ for entry of control signals and for audio input and output; video camera 230 for video input (such as a video camcorder); and television(s) 240 for video output (as or in lieu of video displays 225). When providing POTS service, the video access apparatus 150 interfaces with the typical, existing twisted-pair cabling 294 in the user (or subscriber) premises so that any telephone in the user premises, such as telephones $295_1$ through $295_n$, may be used. The video access apparatus 150 also provides line current and traditional "BORSHT" functions for typical (POTS) telephone service, as explained in greater detail below.

When providing video conferencing service, any of the plurality of telephones $295_1$ through $295_n$ (individually and collectively referred to as telephone(s) 295) may be used for call (conference) establishment or set up and for audio input and output. The radio frequency output video signal (from the video access apparatus 150) may be displayed on any of the televisions 240 connected to the second communication channel 227 (such as a CATV coaxial cable) within the user premises, using a vacant channel within the CATV downstream frequency band (for example, channel 3 or 4). The radio frequency output video signal is originally received from the network 140 in a modulated digital form, such as digital data modulated and encoded utilizing a protocol such as CACS, which may be referred to as a received or first protocol signal. The first protocol signal is received over the audio/video network 100, having been transmitted via, for example, the primary station 105 and the network 140, from another, second user premises. The first protocol signal, typically consisting of compressed digital data, is received by the video access apparatus 150, which decompresses the data and converts it to a baseband output video signal, such as an NTSC/PAL composite video signal (NTSC being a video format typically utilized in North America and Japan, with PAL being a video format typically utilized in Europe).

Other video formats may also be used, such as SECAM or HDTV. This baseband output video signal (on line 271) is then RF modulated (using RF modulator 270)onto an available video RF carrier and injected into the second communication channel 227 (e.g, coaxial cable) at the user premises using a directional coupler 290 (preferably 4 port). The radio frequency output video signal is then sent to all television receivers, such as televisions 240, within the user premises, such as a home or office. The directional coupler 290 is used in the preferred embodiment to provide directional signal injection while providing isolation with any connected CATV network.

The video signal originating in the user premises and to be transmitted via the primary station 105 and the network 140 to another, second user premises (or other location), originates from a video camera (or camcorder) 230 that produces a video signal, such as an NTSC/PAL composite video signal, which is also preferably modulated on channel 3 or 4 (61.25 or 67.25 MHz). This RF video signal from the video camera 230 is connected or coupled to a camera interface 235, which utilizes an offset mixer to shift the RF video signal (typically on a 61.25 or 67.25 MHz carrier) up to a spectrum higher than typical CATV frequencies, such as the 1.2 GHz or 900 MHz bands. For those video cameras 230 which may not include a modulator to shift the NTSC/PAL composite video signal to channel 3 or 4, such modulation may be incorporated into the camera interface 235; conversely, the functions of the camera interface 235 may also be incorporated directly into the video camera 230. The shifted video signal from the camera interface 235, referred to as a radio frequency input video signal, is then injected into the same second communication channel 227 (also connected to the televisions 240) which transmits the radio frequency input video signal back to the video access apparatus 150. The video access apparatus 150 receives the radio frequency input video signal from the directional coupler (at 1.2 GHz or 900 MHz) and demodulates the signal to baseband using RF demodulator 275, to form the baseband input video signal (on line 272). The baseband input video signal is then converted to digital form and compressed, to form a second protocol signal, such as a TDMA signal, and is then π/4-DQPSK modulated (to form a transmitted protocol signal) and transmitted over the audio/video network 100. In the preferred embodiment, by using a vacant video channel at 1.2 GHz or 900 MHz, interference with the downstream and upstream CATV services tends to be avoided. The 1.2 GHz or 900 MHz signal is also filtered out of the feed-through cable or link 287 by a low pass filter 285, so that the signal is highly attenuated before it may leave the video access apparatus 150.

While the primary function of the video access apparatus 110 (or 150) and the video conferencing system 200 (or 300) is to provide full-duplex video communications, other secondary functions are also available in the preferred embodiment. For example, one such secondary function is a "loop back function" which allows the user to view the video from the video camera 230 on the screen of a television 240 or video display 225, such that the RF input video signal is demodulated (from 1.2 GHz or 900 MHz), remodulated onto a video RF carrier, and utilized for the RF output video signal. Such a loop back feature is especially valuable for surveillance, such as for home security or for baby monitoring. Also, a picture-in-picture (or multiple window) function may be provided, in which a user may view a small window of the video from video camera 230 along with the received video from another location, for example, to provide baby monitoring within the small window while simultaneously watching a movie or video received from a CATV network.

In addition, the video access apparatus 110 (or 150) may be frequency agile, such that video conferencing may occur on any channel. While video conferencing on typically empty channels such as channels 3 or 4 may be preferable, in accordance with the invention disclosed in the second related application, video conferencing on additional channels is also feasible. For example, an existing video channel may be blanked out or eliminated, utilizing a notch filter, for any length of time, and the various input and output video signals inserted or overlaid into the now empty (filtered or muted) channel. Such frequency agility and injection of an audio/video signal, in the presence of existing programming, is one of many truly unique features of the invention disclosed in the second related application.

Figure 4:
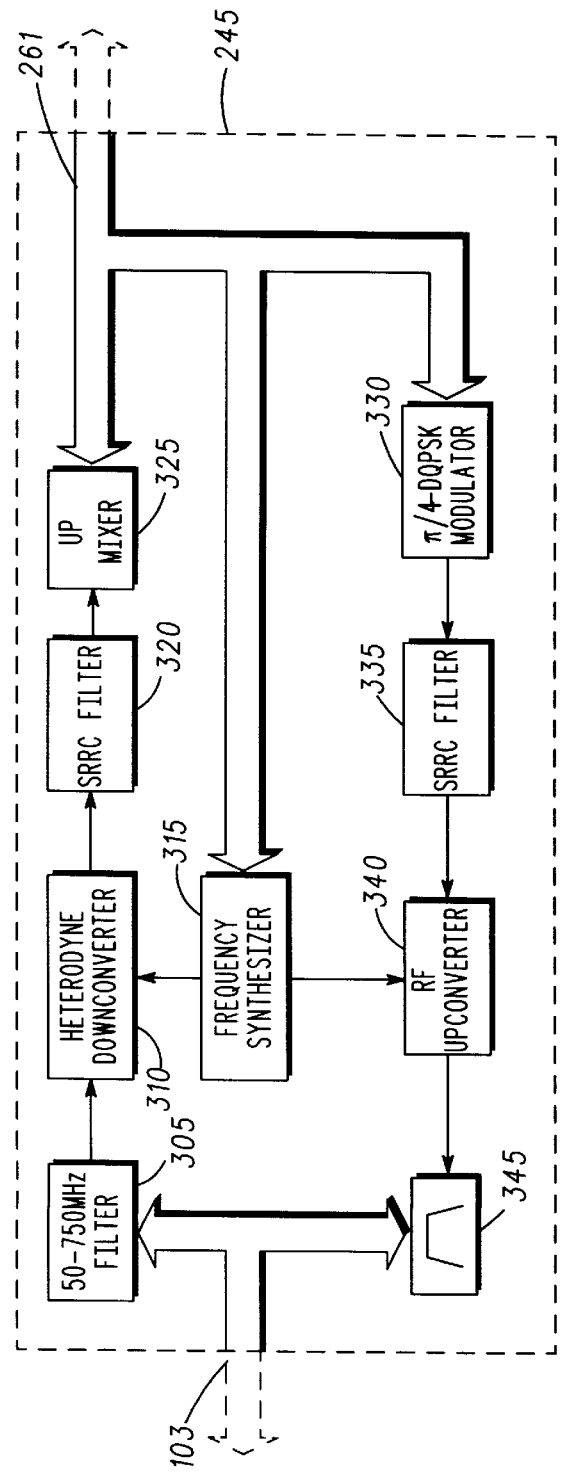
FIG. 4 is a block diagram illustrating a CATV RF transceiver of the preferred apparatus embodiment of the invention disclosed in the second related application.

FIG. 4 is a block diagram illustrating a CATV RF transceiver 245 of the preferred apparatus embodiment in accordance with the invention disclosed in the second related application. In the preferred embodiment, the CATV RF transceiver 245 is frequency agile, providing upconversion and downconversion of the CACS signals to and from any available CACS carrier, with frequency control provided by the microprocessor subsystem 260. Referring to FIG. 4, a first protocol signal, such as a CACS Π/4-DQPSK modulated downstream carrier in the 50–750 MHz CATV band, is received from the first communication channel 103 and filtered in the filter 305 (having a 50–750 MHz bandwidth), and in heterodyne downconverter 310, is heterodyne downconverted to baseband, with this incoming baseband signal having inphase ("I") and quadrature ("Q") components (or signals). The local oscillators for the heterodyne downconverter are provided by a frequency synthesizer subsystem 315. The I and Q components are then square root raised cosine ("SRRC") filtered in a first SRRC filter 320 to remove noise and other distortions. The filtered I and Q components are then mixed up to an intermediate frequency (IF) signal at 1.2 MHz, in the up mixer 325, for transfer to the communications ASIC 250 on bus 261(or on another line connecting the up mixer 325 to the communications ASIC 250). In the preferred embodiment, the CACS carrier has a symbol rate of 384 kilosymbols/second and is transmitted with an excess bandwidth factor of 0.5, and with an occupied channel bandwidth of 600 kHz.

Continuing to refer to FIG. 4, a second protocol signal, such as a 768 kb/s TDMA burst, originating from the communications ASIC 250, is applied to a Π/4-DQPSK waveform generator or modulator 330, which outputs baseband I and Q components (signals). The I and Q signals are SRRC filtered (in second SRRC filter 335) and then upconverted in RF upconverter 340 to the 5–40 MHz CATV upstream band, to form a transmit (or transmitted) protocol signal. As in the downconverter 310, local oscillators for the RF upconverter 340 are provided by the frequency synthesizer subsystem 315. The transmit power of the TDMA burst is programmable by the microprocessor 350 of the microprocessor subsystem 260 (discussed below with reference to FIG. 5) to provide network gain control, by the audio/video network 100, over any individual video access apparatus 110 or 150 connected to the audio/video network 100.

Figure 5:
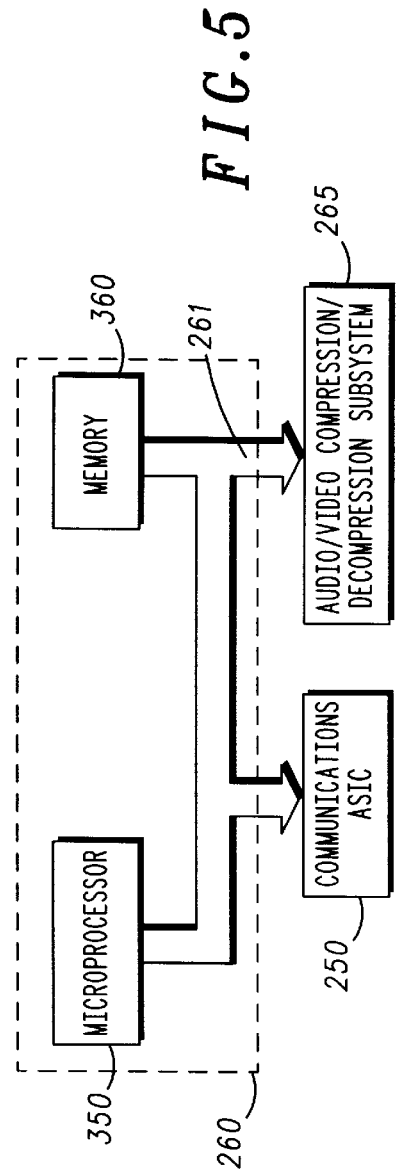
FIG. 5 is a block diagram illustrating a microprocessor subsystem and communications ASIC of the preferred apparatus embodiment of the invention disclosed in the second related application.

FIG. 5 is a block diagram illustrating a microprocessor subsystem 260 and communications ASIC 250 of the preferred apparatus embodiment in accordance with the invention disclosed in the second related application. The communications ASIC 250 is utilized in the preferred apparatus embodiment to provide low-level baseband functions to support a protocol such as CACS. Functionally, communications ASIC 250 may be separated into a receive section and a transmit section (not separately illustrated in FIG. 5).

Figure 6:
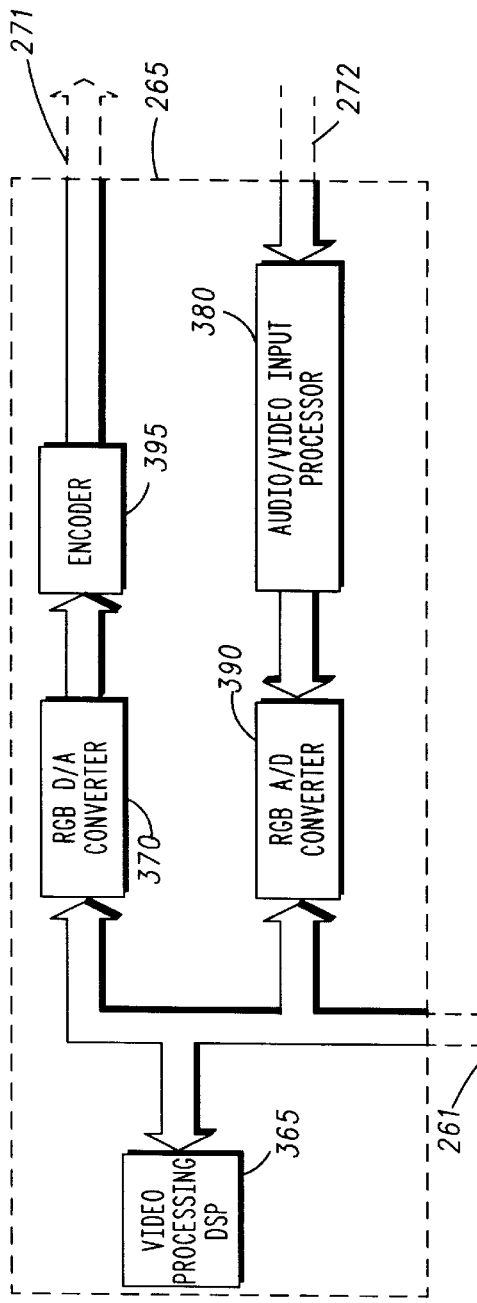
FIG. 6 is a block diagram illustrating a audio/video compression and decompression subsystem of the preferred apparatus embodiment of the invention disclosed in the second related application.

In the receive section, the IF signal at 1.2 MHz (from the up mixer 325 of the CATV transceiver 245), contains the Π/4-DQPSK modulated CACS signal. This downstream CACS Π/4-DQPSK TDM signal is coherently demodulated, to provide baseband binary data as well as recovery of symbol and bit timing information. A TDM frame is then synchronized and decoded, time slot data is extracted, and error control checking is performed. Such supervisory data, as well as user data in the payload, is then made available to the microprocessor subsystem 260 via the bus 261, which may be an address/data bus. The user data may also be directly routed out of the communications ASIC 250 for delivery to the audio codec 410 (FIG. 7) or the audio/video compression and decompression subsystem 265 (FIG. 6). In the transmit section of the communications ASIC 250, control data originating from the microprocessor 350, and compressed audio and video data from the audio/video compression and decompression subsystem 265, are transferred to the communications ASIC 250, to create an audio/video data stream. The audio/video data stream is then formatted with synchronization and error control information, resulting in binary TDMA bursts, which are then transferred to the CATV transceiver 245 for subsequent modulation and transmission as a transmitted protocol signal over the first communication channel 103. In the preferred embodiment, the communications ASIC 250 also provides other functions to support the video access apparatus 150, including TDMA time alignment, sleep mode control for low power operation, data buffering for rate control, and interrupt generation of POTS interface control signals.

Continuing to refer to FIG. 5, the microprocessor subsystem 260 consists of a microprocessor 350 or other processing unit, such as the Motorola MC68LC302, and memory 360, which includes random access memory (RAM) and read-only memory (ROM), with communication to the communications ASIC 250 and the audio/video compression and decompression subsystem 265 provided over the bus 261. The read only memory portion of memory 360 also utilizes flash programmable memory, such that the memory contents may be downloaded over the audio/video network 100 using a protocol such as CACS. As a consequence, different versions of operating software (program instructions), such as upgrades, may implemented without modifications to the video access apparatus 150 and without user intervention.

Continuing to refer to FIG. 5, the microprocessor subsystem 260 provides device control and configuration, as well as higher layer CACS functions, such as call processing, and is also used to implement an ISDN protocol stack when required for video calls. Because the microprocessor subsystem directly interfaces with the communications ASIC 250 with access to the CACS channel user data, a high speed data link may be established between the communications ASIC 250 and the audio/video compression and decompression subsystem 265 using the microprocessor subsystem 260 as the data exchange and protocol conversion device. User audio, in the form of a pulse code modulated (PCM) data stream, may also be routed through the microprocessor 350 to the audio/video compression and decompression subsystem 265 from the DSP 415 of the user/audio interface 255.

FIG. 6 is a block diagram illustrating an audio/video compression and decompression subsystem 265 of the preferred apparatus embodiment in accordance with the invention disclosed in the second related application. The audio/video compression and decompression subsystem 265 performs video compression of the baseband input video signal (originating from the video camera 230 and camera interface 235), and decompression of the video data contained in the payload of the received, demodulated first protocol signal (such as a CACS signal), for subsequent display on the television(s) 240. The audio/video compression and decompression subsystem 265 includes a video processing digital signal processor (DSP) 365, a red-green-blue digital to analog converter 370, a red-green-blue analog to digital converter 390, an encoder 375, and an audio/video input processor 380. The video processing DSP (or video processing DSP subsystem) 365 is a high-speed programmable DSP (or DSP arrangement or subsystem, such as a Motorola MC56303 with associated support components, including memory and a hardware acceleration ASIC (discussed below)), utilized to implement different video and audio compression and decompression algorithms, depending on the transmission rate and/or video conferencing standard at the remote end (i.e., the other premises with which the video access apparatus is communicating). The program code for the video processing DSP 365 may also be downloaded from the microprocessor subsystem memory 360, which may also be downloaded through the audio/video network 100 using a protocol such as CACS. As a consequence, video functionality of the video access apparatus 150, including new algorithms, may be changed or upgraded on-the-fly, also without any hardware changes and without user intervention.

Continuing to refer to FIG. 6, compressed video data received from the network 140 (as, for example, a π/4-DQPSK TDM CACS protocol signal), having been previously demodulated, demultiplexed and reformatted into video data by the communications ASIC 250 and the microprocessor subsystem 260, is transferred to the video processing DSP 365 where it is decompressed and converted to red-green-blue ("RGB") digital video signals. The RGB digital video signals are then converted to RGB analog signals, by the RGB digital to analog ("D/A") converter 370, such as the Motorola MC44200. The analog RGB signals, along with a composite synchronization signal, are then applied to an encoder 375, preferably an NTSC/PAL encoder such as a Motorola MC13077, resulting in an NTSC/PAL composite video signal, which may also be referred to as a baseband output video signal. The NTSC/PAL composite video signal is then transferred to the RF modulator 275 for upconversion to a radio frequency (to form the radio frequency output video signal), followed by transmission on the second communications channel 227 and display on the television 240.

For subsequent transmission over the network 140 of an input video signal (originating from the video camera 230 and the camera interface 235), a baseband input video signal, such as an NTSC/PAL composite video camera or camcorder signal, is received from the RF demodulator 270. The baseband input video signal is transferred to an audio/video input processor 380, such as a Motorola MC44011, which converts the baseband input video signal to analog RGB signals, while also providing a genlocked sampling clock for subsequent digitizing of the video signals. These input analog RGB signals are then converted to digital RGB signals by a RGB analog to digital converter 390, such as the Motorola MC44250, and transferred to the video processing DSP 365. The video processing DSP 365 compresses the digital RGB signals, and transfers the resulting data stream to the communications ASIC 250 or microprocessor subsystem 260 for protocol encoding and modulation, for subsequent delivery to the network 140. In the preferred embodiment, the audio/video compression and decompression subsystem 265 may also include additional random access memory for use by the video processing DSP 365 for partial or full storage of pixel data of an input/output video frame. Also in the preferred embodiment, a hardware acceleration ASIC is used to assist the video processing DSP 365 in processing speed intensive tasks, such as discrete cosine transforms associated with the compression and decompression processes.

Figure 7:
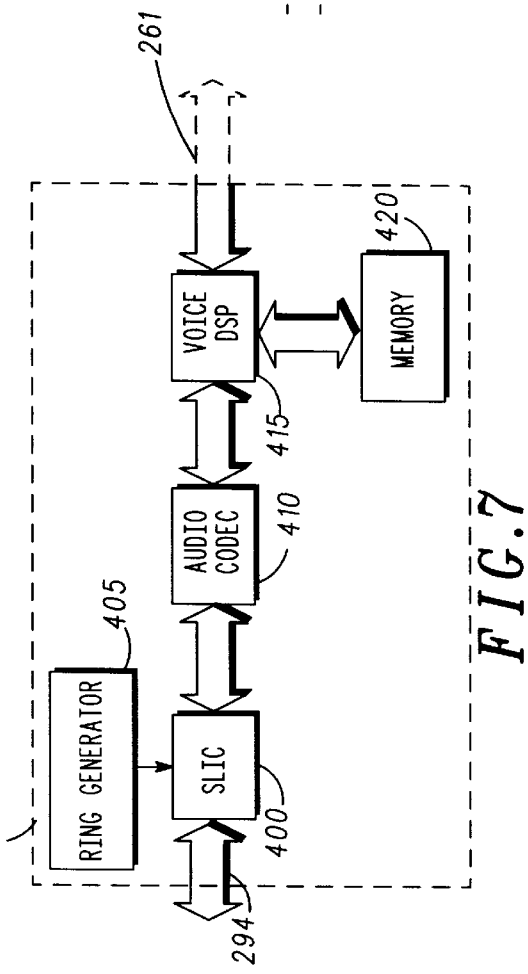
FIG. 7 is a block diagram illustrating a user audio interface of the preferred apparatus embodiment of the invention disclosed in the second related application.

FIG. 7 is a block diagram illustrating a user audio interface 255 of the preferred apparatus embodiment in accordance with the invention disclosed in the second related application. The user audio interface 255 is designed to interface with standard household telephone sets, including wireless devices and speakerphones, such as telephones $295_1$ through $295_n$. The user audio interface 255 is intended to support both audio POTS calls and video calls. In the preferred embodiment, POTS calls are processed in a "transparent" mode, such that placing and receiving telephone calls occur as if no video call functions were present. Also in the preferred embodiment, video calls are processed as an exception, requiring a designated or predetermined dialing sequence entered by the user to invoke a video call.

Referring to FIG. 7, a SLIC (Subscriber Loop Interface Circuit) 400 provides "BORSHT" functions for telephone service within the user premises, such as that normally provided by a network central office, including DC (direct current) power for the telephone (Battery); Overvoltage protection; Ring trip detection and facilitation of ringing insertion; Supervision features such as hook status and dial pulsing; Hybrid features such as two-wire differential to four-wire single-ended conversions and suppression of longitudinal signals at the two-wire input; and Testing. The SLIC 400 communicates with the telephones $295_1$ through $295_n$ through an ordinary telephone line, such as twisted pair cabling 294, which has tip and ring lines. The ring generator 405 provides high-voltage AC (alternating current) signals to ring the telephones $295_1$ through $295_n$. Connected to the SLIC 400, the audio codec 410 provides analog-to-digital conversion for voice digitizing of the input (voice) audio signal originating from the microphone portion of one or more of the telephones $295_1$ through $295_n$, to form an input (PCM) digital voice data stream or signal, and digital-to-analog conversion for voice recovery from an output (PCM) digital voice data stream or signal (to create the output audio signal to the speaker portion of the telephones $295_1$ through $295_n$), and well as band limiting and signal restoration for PCM systems. The output and input (PCM) digital voice data streams connect directly to the voice processing DSP 415. The voice processing DSP 415, such as a Motorola $MC_{56166}$, contains program memory and data memory to perform signal processing functions such as DTMF/dial pulse detection and generation, call progress tone (dial tone, busy tone) generation, PCM-to-linear and linear-to-PCM conversion, and speech prompt playback. The voice processing DSP 415 may also provide V.34 and V.34bis modem functions to additionally support POTS or other analog-based video calls. The voice processing DSP 415 interfaces with the microprocessor subsystem 260 and the communications ASIC 250 over the bus 261. The memory 420 (connected to the voice processing DSP 415), in the preferred embodiment, includes high density read only memory (referred to as speech ROM) containing PCM encoded (or compressed) speech segments used for interaction with the user, such as in prompting the user for keypad DTMF or dial pulse entry when in the video calling mode. In addition, optional speech random access memory may be used for user voice storage functions, and electrically alterable, programmable non-volatile (flash) memory for storage of programs (and updates) or algorithms.

The user audio interface 255, in the preferred embodiment, operates in one of two modes, first, for telephony (POTS), and second, for video conferencing (calling). The telephony (POTS) mode is user transparent, as a default mode which is entered whenever the user goes off hook. As discussed in greater detail below, the video conferencing mode is entered as an exception, through the user entering (dialing) a specific, predetermined sequence which, in the preferred embodiment, is not recognized as a telephony sequence. In the telephony (POTS) mode, the voice processing DSP 415 generates the customary "dial" tone when the user telephone (of the telephones $295_1$ through $295_n$) goes off hook. The user then enters the dialing sequence, just as in known or customary telephone dialing. The voice processing DSP 415 decodes the dialing digits and stores them in a calling memory buffer of memory 420. Upon decoding the first two digits entered (which are not the first two digits of the specific predetermined video call sequence), the voice processing DSP 415 recognizes that the requested call is not a video call and, as a consequence, signals the microprocessor subsystem 260 to initiate a POTS call through the audio/video network 100 using a protocol such as CACS. When the call is granted (by the network 140) and the audio link with the local digital switch 135 is established, the voice processing DSP 415 forwards the stored digits to the local digital switch 135 and connects the audio paths between the user's telephone(s) and the network 140. From this point on, the voice processing DSP 415 will not decode any dialed digits and will simply pass through the input and output PCM digital voice data stream, until the user's telephone goes on hook and the call is terminated.

Alternatively for a telephony session, the audio/user interface 255 may create or maintain a connection to a central office of a network 140, to provide transparency for telephony. Once the entry of the specific predetermined sequence for video mode is detected, the audio/user interface 255 breaks or terminates the central office connection, and enters video mode, under local control of the video access apparatus 150 (or 110).

As indicated above, the user initiates the video conferencing mode as an exception to the normal telephony mode, by entering a specific predetermined sequence which is recognized by the voice processing DSP 415 as a non-telephony sequence and, additionally in the preferred embodiment, as the predetermined sequence specific to the video mode. This methodology is also discussed below with reference to the flow chart of FIG. 12. For the video conference mode of the preferred embodiment, the first two digits of the specific, predetermined sequence are unique and specifically unused in a standards POTS call, such as "* *", and as a consequence, may specifically signal the audio voice processing DSP 415 to enter the video call mode. Alternatively, other specific, predetermined sequences could be programmed by the user for recognition as a video conference mode by the voice processing DSP 415. Immediately after decoding the two special digits or other specific predetermined sequence, the voice processing DSP 415 generates or plays a speech prompt sequence, such as "Please select a call option or press the '#' key for help", which is stored in the speech ROM portion of memory 420. The action taken by the voice processing DSP 415 will then depend upon the sequence entered or key pressed by the user following the initial prompt. For example, if the '#' key is pressed, the user may hear a menu of commands such as, for example, the following:

"To place a Directory call, press *"
"To update the call Directory, press 2"
"To place a manual video call, press 3"
"To mute the camera, press 4"
"To view the camera on your television, press 5"
"To hear this menu again, press #"

Thus, in the preferred embodiment, an automated and user friendly prompting sequence is used to guide the user through placing a video conference call. Once the entry is complete, the information is then passed from the voice processing DSP 415 to the microprocessor subsystem 260, which will then attempt to connect the call through the network 140. If successful, the audio paths (input and output audio signals) will be connected through to the telephones 295$_1$ through 295$_n$, the output video path will be connected through to the television 240 or other video display 225, and the input video path will be connected from the camera interface 235 (originating from the video camera 230). Alternatively, under user control, the output audio path may also be connected to a television 240, for broadcast over the speakers within the television(s) 240, and the input audio path may also originate from a microphone within the video camera 230 and be connected via the camera interface 235. This alternate path may be particularly useful when the user desires to video tape the video conference, for example, utilizing an ordinary VCR coupled to the television 240. The video call terminates when the telephone goes on hook, or another control signal is entered via the user interface 215 or user/audio interface 255.

It should be noted that in the preferred embodiment, a simple directory feature may be used to simplify the video calling process. For example, after the user goes off hook and presses the '*' key three times followed by a single digit '1', '2' . . . '9', a call automatically may be placed using a sequence of numbers stored in the directory for that digit. This feature may be necessary or desirable under a variety of circumstances, for example, when an ISDN call may require the entry of two separate 10-digit numbers to connect the call through the network 140. Also as an option in the preferred embodiment, a more sophisticated system may store a simple name tag or other alphanumeric entry associated with the directory entry, created by the user, and played back to the user by the voice processing DSP 415. For example, a prompt in response to making a directory call may be: "To call 'grandma', press 1"; "To call 'mother', press 2"; "To call 'work', press 3"; in which the speech segments "grandma", "mother", and "work" are spoken by the user, recorded and stored in memory 420. More sophisticated systems may include speaker/voice recognition techniques, to recognize the user selection, eliminating the need to press any keys on a telephone keypad or other manual entry of information into the user interface 215 or user/audio interface 255. It should also be noted that video call control functions, such as camera muting, unmuting, and local playback (loop back), also may be selected with the same user interface. Other sophisticated systems may also include use of the video display 225 or television 240 for on-screen visual display of a menu of options, with corresponding entry of user control signals, such as call control and placement information, occurring in a variety of ways, such as through the keypad of the telephones 295, through a infrared remote control link with the video access apparatus 150 (or 110), or through the input video path via the second communication channel 227. These various methods of user prompting, on-screen display, and user feedback are especially useful to guide the user through the process of placing a video call, and help to make the audio video conferencing system 300 (or 200) especially user-friendly. In addition, these various methods also illustrate the "tri-ality" of the use of a telephone 295 in the preferred embodiment, for telephony, for audio input and output, and for call control.

Figure 8:
FIG. 8 is a block diagram illustrating an RF modulator of the preferred apparatus embodiment of the invention disclosed in the second related application.

FIG. 8 is a block diagram illustrating an RF modulator 270 of the preferred apparatus embodiment in accordance with the invention disclosed in the second related application. The RF modulator 270 converts the baseband output video signal from the audio/video compression and decompression subsystem 265, such as an NTSC/PAL composite video signal, to a radio frequency output video signal, such as an amplitude modulated vestigial sideband RF signal, which may be viewed via the receiver of the user's television 240, for example, when tuned to channel 3 or 4. The RF modulator 270 may be implemented in a variety of ways, including through use of a video modulator 425, such as a Motorola MC1373, followed by a gain stage (amplifier) 430, utilized in the preferred embodiment to overcome losses from the directional coupler 290 which feeds the RF output video signal into the second communication channel 227, such as the coaxial cable system in the user premises. A switchable notch filter may also be used to remove current programming from a particular channel (RF video carrier), while inserting the radio frequency output video signal into the second communication channel 227.

Figure 9:
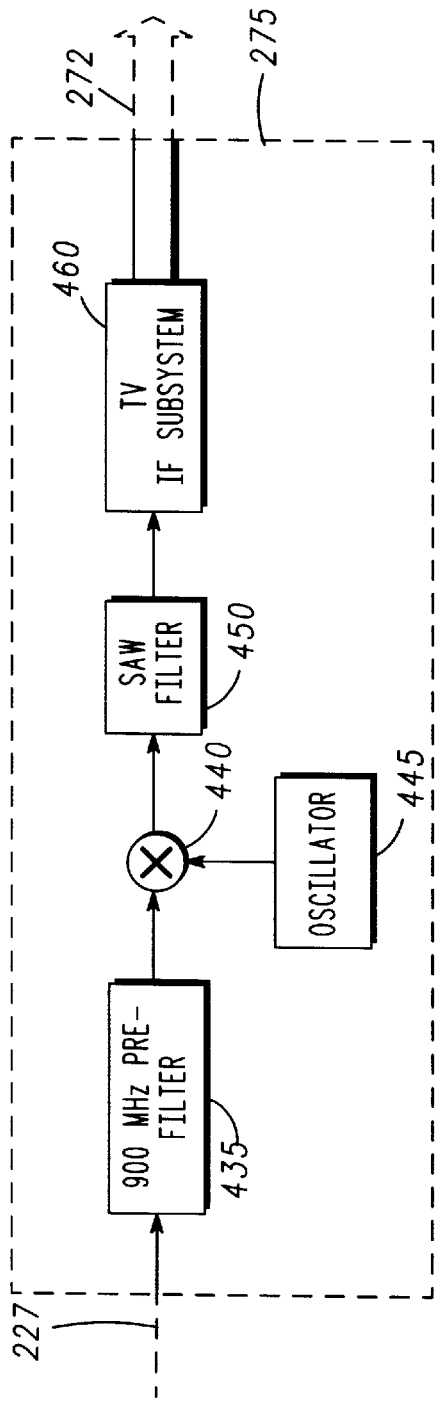
FIG. 9 is a block diagram illustrating an RF demodulator of the preferred apparatus embodiment of the invention disclosed in the second related application.

FIG. 9 is a block diagram illustrating an RF demodulator 275 of the preferred apparatus embodiment in accordance with the invention disclosed in the second related application. In the preferred embodiment, the RF demodulator 275 is a full heterodyne receiver tuned to a specific channel in the 900 MHz band or 1.2 GHz band, to receive the radio frequency input video signal from the camera interface 235 (originating from the video camera 230). The radio frequency input video signal, fed into the RF demodulator 275 from the directional coupler 290, is bandpass filtered (at either 900 MHz or 1.2 GHz) in prefilter 435, then mixed down to an intermediate frequency (IF) of, for example, 45 MHz, using the mixer 440 and a fixed reference oscillator 445. The signal is then surface acoustic wave (SAW) filtered by the SAW filter 450, or otherwise bandpass filtered, and transferred to a (color) TV IF subsystem 460, such as a Motorola MC44301, which provides amplification, AM detection (demodulation), automatic fine tuning, resulting in a baseband input video signal (baseband composite input video signal). This baseband input video signal is then transferred to the audio/video compression and decompression subsystem 265 for further processing as discussed above.

Figure 10:
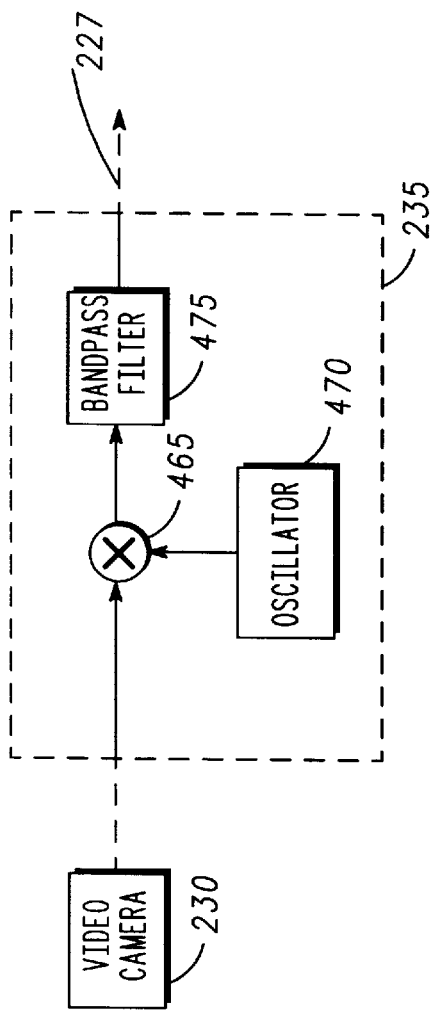
FIG. 10 is a block diagram illustrating a camera interface of the preferred apparatus embodiment of the invention disclosed in the second related application.

FIG. 10 is a block diagram illustrating a camera interface 235 of the preferred apparatus embodiment in accordance with the invention disclosed in the second related application. The camera interface 235 is used in conjunction with a video camera (or camcorder) 230 that outputs its signal as an RF video carrier on channel 3 or 4 (61.25 or 67.25 MHz), and is used to upconvert the video carrier to an RF carrier at 900 MHz or 1.2 GHz without demodulation and modulation of the video signal. As illustrated in FIG. 10, the input video signal from the video camera 230 is mixed up to the required output frequency using an offset mixer 465, a fixed reference oscillator 470, and a bandpass filter 475. Not illustrated in FIG. 10, if additional input video signals are desired from, for example, additional video cameras, the input video signals may also be multiplexed. This feature may be desirable, for example, when the system is to be used for surveillance of multiple points or locations, or when the user desires to transmit additional windows or screens within screens.

Alternatively, as mentioned above, the camera interface 235 may be directly incorporated within the video camera 230. In addition, for those video cameras producing a NTSC/PAL composite video signal (rather than an RF video carrier on channel 3 or 4), an additional stage may be added within the camera interface 235 to modulate the NTSC/PAL composite video signal to an RF video carrier prior to offset mixing by offset mixer 465, or in lieu of offset mixing, directly modulating the NTSC/PAL composite video signal to 900 MHz or 1.2 GHz to form the RF input video signal.

Not illustrated in the various apparatus diagrams, the video access apparatus 110 (or 150) may be dual powered, deriving supply voltages from both power provided by the audio/video network 100 and power provided by the user premises. The power provided by the audio/video network 100 is used for those circuits that support basic telephony (POTS) service. The power provided by the user premises is used for those circuits that support video. Alternatively, the video access apparatus 110 (or 150) may be completely powered by the audio/video network 100. As a consequence, if a power failure occurs in the user premises, basic telephony service may still be operational, or if fully powered by the audio/video network 100, complete audio/video conferencing and telephony may still be operational.

Figure 11:
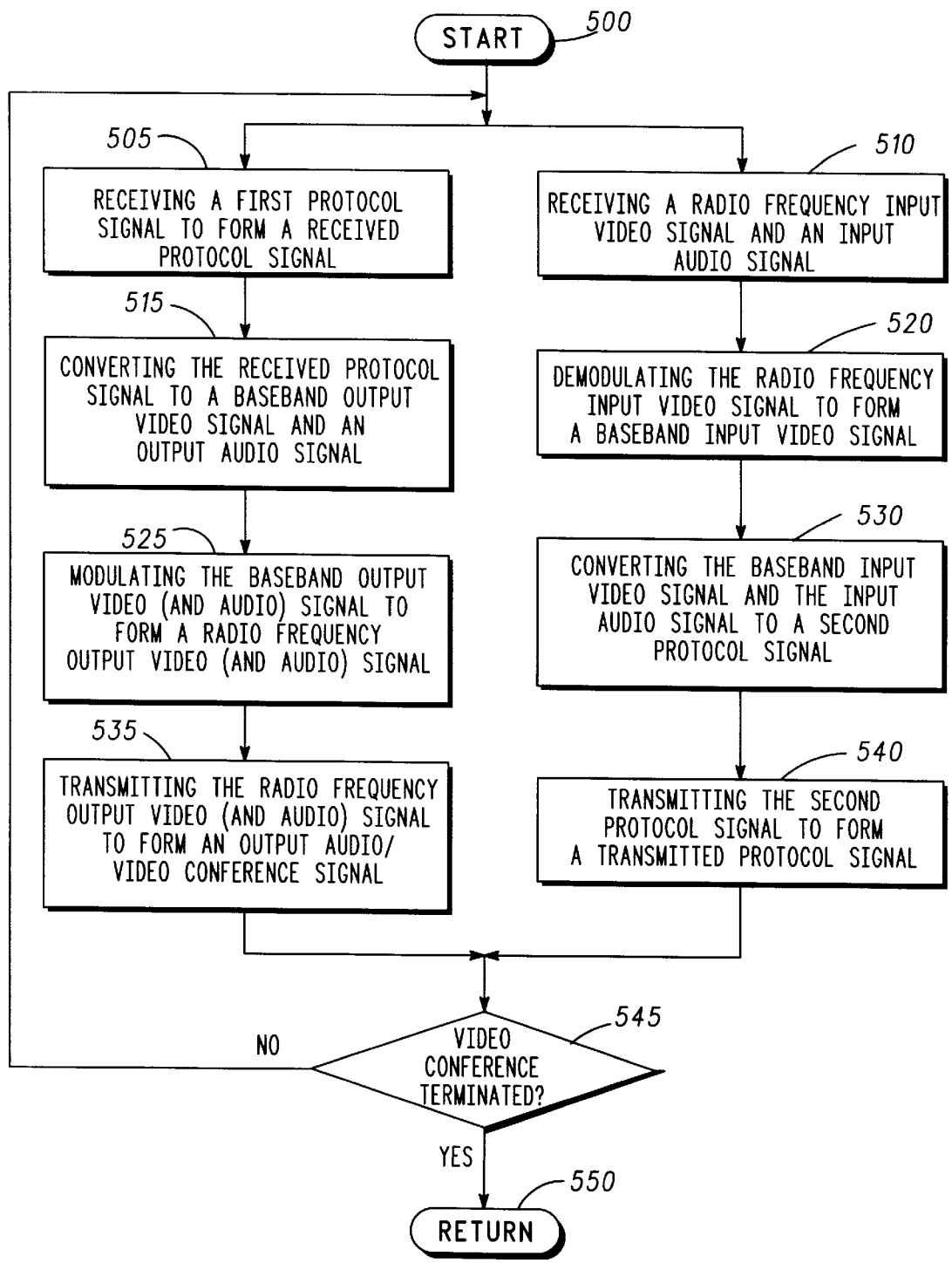
FIG. 11 is a flow diagram illustrating the method of the preferred embodiment of the invention disclosed in the second related application.

FIG. 11 is a flow diagram illustrating the method of the preferred embodiment of the invention disclosed in the second related application. As illustrated in FIG. 11, the method begins, start step 500, with receiving a first protocol signal, such as a CACS signal, to form a received protocol signal, step 505. In the preferred embodiment, step 505 is performed in the video network interface 210 or in the CATV RF transceiver 245. Next, in step 515, the received protocol signal is converted to a baseband output video signal and an output audio signal. In the preferred embodiment, step 515 is performed by the video network interface 210 and processor arrangement 190, or by the CATV RF transceiver 245, the communications ASIC 250, and the microprocessor subsystem 260. In the preferred embodiment utilizing audio 220 or telephones 295 for audio output and input, an important feature of the invention disclosed in the second related application is the independence of the output audio signal from the output video signal. In the event that a television 240 or other video display 225 is also to be used for audio output, the output audio signal may be combined with the baseband output video signal (rather than separating out the audio portion and separately routing it to audio 220 or telephones $295_1$ through $295_n$). Next, in step 525, the baseband output video signal (and possibly output audio signal as well) is modulated to form a radio frequency output video (and audio) signal, also referred to as a composite output video signal, and in step 535, the RF output video (and audio) signal is transmitted. In the preferred embodiment, steps 525 and 535 are performed by the RF modulator/demodulator 205 or the RF modulator 270.

Concurrently with steps 505, 515, 525 and 535 (involving receiving (at a local location) video conference information transmitted from another location, such as a remote location), in the preferred embodiment, steps 510, 520, 530 and 540 are also occurring (involving transmitting (from a local location) video conference information to another location, such as a remote location). In step 510, a radio frequency input video signal and an input audio signal are received. As indicated above, in the preferred embodiment, the input video signal and input audio signal are each independent of the other. In the preferred embodiment, the radio frequency input video signal is received by the RF demodulator 275 or the RF modulator/demodulator 205 from the camera interface 235, and an input audio signal is received by either the audio 220 and user interface 215, or telephones $295_1$ through $295_n$. Alternatively, the input audio signal may also be received by a microphone in the video camera 230 and included as part of the RF input video signal from the camera interface 235. Next, preferably in the RF demodulator 275 or the RF modulator/demodulator 205, in step 520 the RF input video (and possibly audio) signal is demodulated to form a baseband input video (and possibly audio) signal. In step 530, the baseband input video signal and the input audio signal are converted to a second protocol signal, such as a TDMA format signal, preferably by the processor arrangement 190, or by the microprocessor subsystem 260 and the communications ASIC 250. In step 540, the second protocol signal is modulated and transmitted to form a transmitted protocol signal, such as a π/4-DQPSK TDMA signal (an upstream CACS signal), preferably by the video network interface 210 or the CATV RF transceiver 245. Following steps 535 and 540, when the video conference has been terminated, step 545, such as by going on hook, the process may end, return step 550, and if the video conference has not been terminated in step 545, the method continues, returning to steps 505 and 510.

Figure 12:
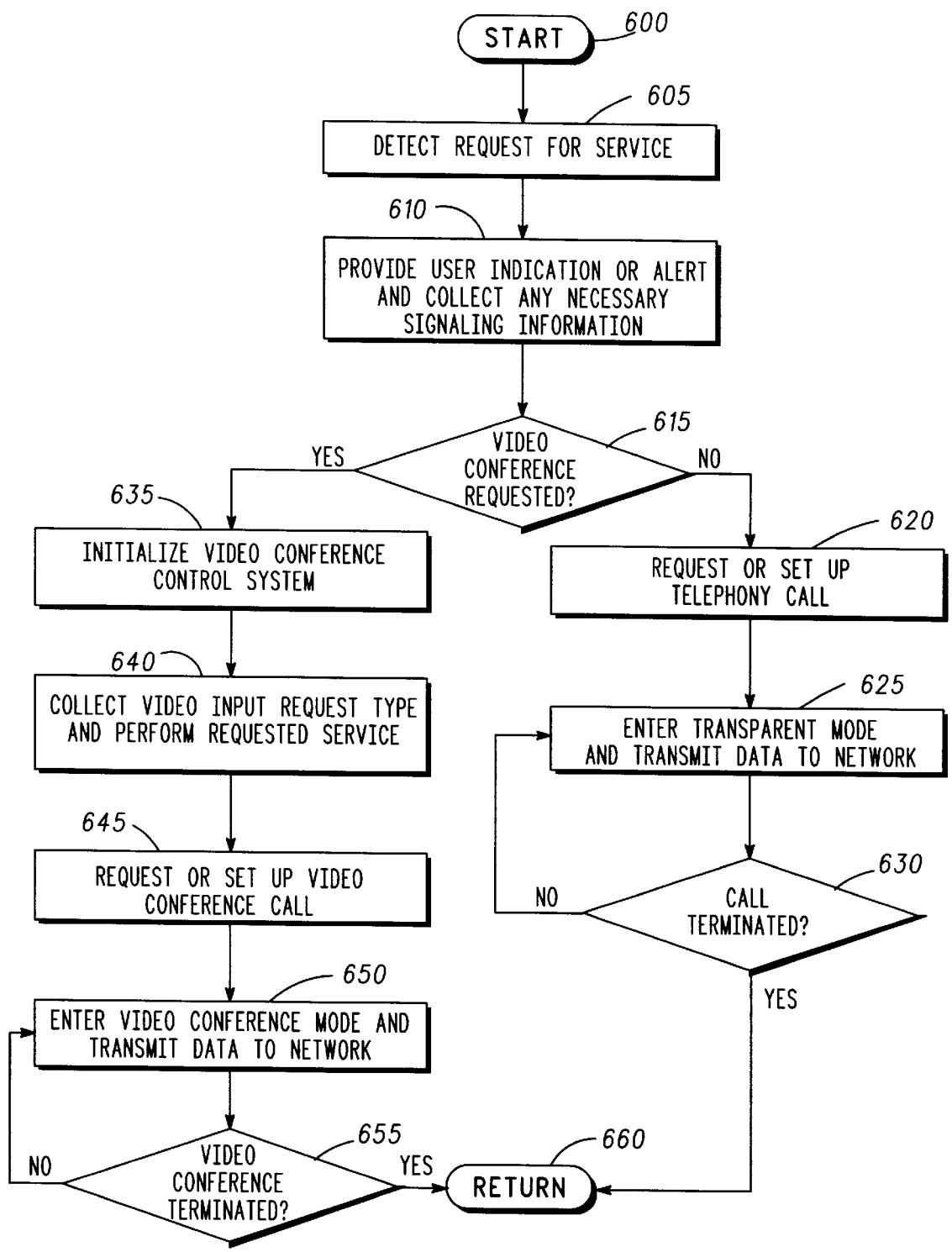
FIG. 12 is a flow diagram illustrating the telephony and video conference control methodology in accordance with the preferred embodiment of the invention disclosed in the second related application.

FIG. 12 is a flow diagram illustrating the telephony and video conference control methodology in accordance with the preferred embodiment of the invention disclosed in the second related application. FIG. 12 also illustrates the multiple roles of a telephone, such as telephones $295_1$ through $295_n$, in the system of the invention disclosed in the second related application, including providing telephony (POTS), providing video call control, and providing the audio portion of the video conference. Referring to FIG. 12, beginning with start step 600, a request for service is detected, step 605, such as going off hook or receiving an incoming alert signal. Next, in step 610, a user indication or alert is provided, such as a dial tone or an incoming ring signal, and signaling information is collected, such as DTMF digits of a phone number or "". When a video conference has been requested in step 615, such as through entry of "" or receipt of an incoming message from the network 140, then the method proceeds to step 635. When a video conference has not been requested in step 615, the method proceeds to request or set up a telephony call, such as generating DTMF tones and connecting an audio path between the user's telephone and the network 140, step 620, followed by entering the transparent telephony mode and transmitting audio (typically PCM) data to the network 140, step 625. The audio data will typically be CACS encoded from the video access apparatus 110 (or 150), and transformed into an appropriate format (e.g., ISDN, POTS, etc.) by the primary station 105 for transmission to the network 140. When the telephony call is terminated, step 630, the method may end, return step 660.

Continuing to refer to FIG. 12, when a video conference has been requested in step 615, the method proceeds to step 635 and initializes the video conference control system, such as playing an initial speech prompt as discussed above. Next, in step 640, the video input request type is collected and the corresponding requested service is performed, such as originating a video conference call using a directory, updating a video conference call directory, manually originating a video conference call, muting an input (audio or video), providing loop back (e.g., local self-view such as monitoring or other surveillance), playing help or error messages or menu options, or exiting the video conferencing control system. In step 645, a video conference call is requested or set up (such as for an incoming video call), and in step 650, the video conference mode is entered, with protocol encoded audio and video data being transmitted to the network 140. When the video conference call is terminated in step 655, such as by going on hook, the method may end, return step 660.

Figure 13:
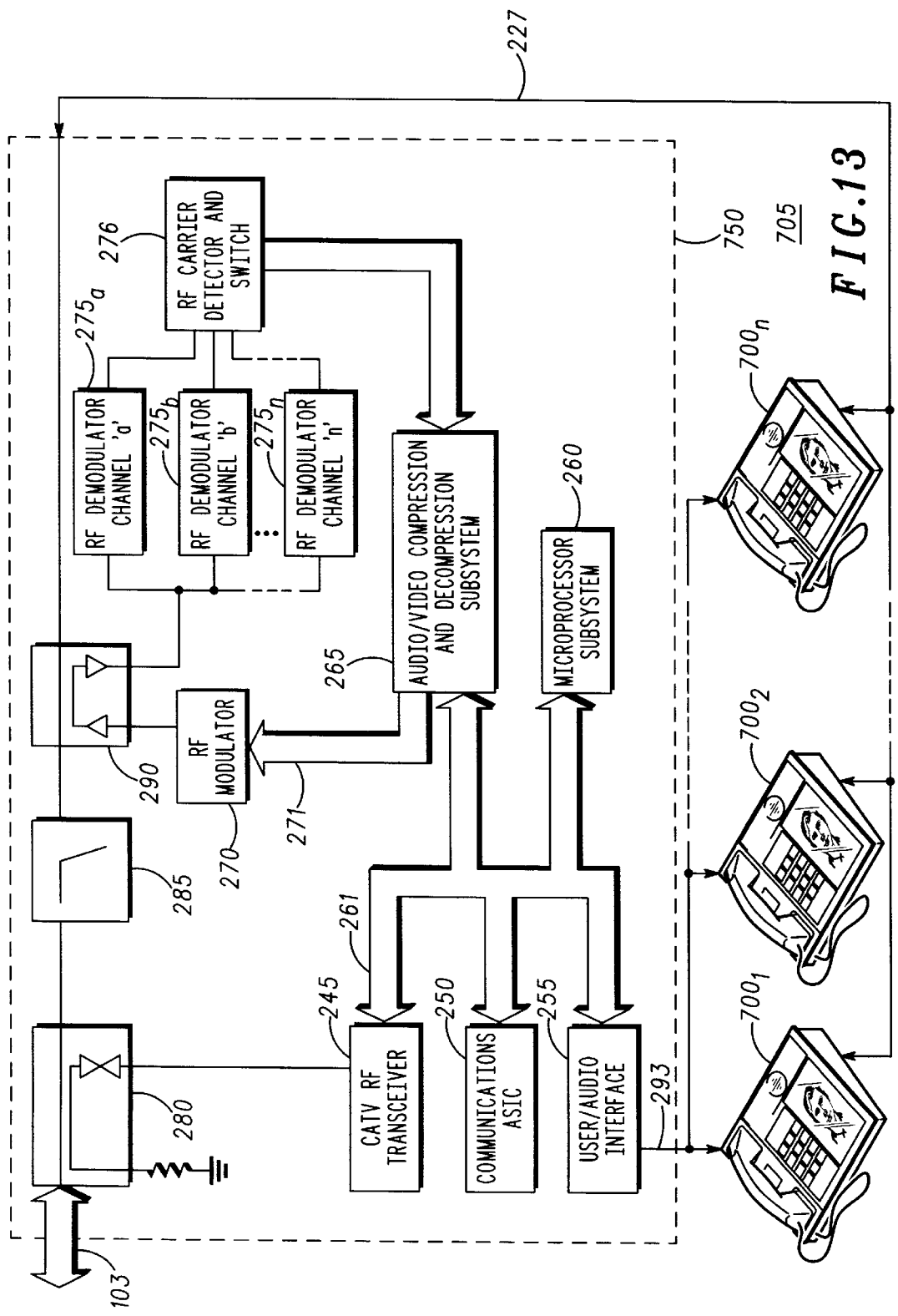
FIG. 13 is a block diagram illustrating a third embodiment of a video access apparatus 750 and a third embodiment of a video conferencing system 705, utilizing a plurality of videophone apparatuses 700, in accordance with the present invention.

FIG. 13 is a block diagram illustrating a third embodiment of a video access apparatus 750, and a third embodiment of a video conferencing system 705 utilizing a plurality of videophone apparatuses 700, in accordance with the present invention. Referring to FIG. 13, a plurality of videophone apparatuses $700_1$, $700_2$ through $700_n$ (individually and collectively referred to as videophone(s) 700 or videophone apparatus(es) 700), are connected to the video access apparatus 705 via a second communication channel 227, such as a coaxial cable within the user premises, and via a third communication channel 293, such as a POTS twisted pair cabling arrangement (which may be identical to line 294 illustrated in FIG. 3). The third embodiment of a video conferencing system 705 comprises one or more of the plurality of videophone apparatuses 700, coupled through the second communication channel 227 and the third communication channel 293 to the video access apparatus 750. Via the first communication channel 103, the video access apparatus 750 is also coupleable to a primary station 105 for communication with the network 140 and the CATV video services infrastructure 102. (Given the plurality of communication channels 103, 227 and 293, for ease of description in the claims enumerated below, when used with reference to a videophone apparatus 700 which is coupleable to the two communication channels 227 and 293, the second communication channel 227 may be referred to as a first communication channel, with the third communication channel 293 referred to as a second communication channel).

Continuing to refer to FIG. 13, the video access apparatus 750 is very similar to the video access apparatus 150 discussed above with reference to FIGS. 3 through 9, and includes many of the same components having the same arrangement and operating in an identical fashion, including the CATV RF transceiver 245, the communications ASIC 250, the user/audio interface 255, the microprocessor subsystem 260, the audio/video compression and decompression subsystem 265, the RF modulator 270, the filter 285, and the directional couplers 280 and 290. The video access apparatus 750 differs from the video access apparatus 150 insofar as the video access apparatus 750 has a RF carrier detector and switch 276, and has a plurality of RF demodulators 275, namely, RF demodulator $275_a$, RF demodulator $275_b$ through RF demodulator $275_n$ (each of which is identical to the RF demodulator 275 illustrated in FIG. 9, and are individually and collectively referred to as RF demodulators 275). The video access apparatus 750 is utilized to multiplex or combine a plurality of input video signals from a plurality of videophones 700 (or 800); when such multiplexing or combining is unnecessary, any of the other video access apparatus embodiments (110 or 150) may also be utilized instead of the video access apparatus 750 in the videoconferencing system 750 illustrated in FIG. 13.

Continuing to refer to FIG. 13, each of the RF demodulators 275 are utilized to receive, on different channels or carriers (such as channels or carriers "a" through "n"), a radio frequency input video signal transmitted from a corresponding videophone apparatus 700 via the second communication channel 227, and to demodulate (downconvert) the received radio frequency input video signal to a baseband input video signal. For example, RF demodulator $275_a$, tuned to a radio frequency corresponding to channel "a" (e.g., tuned via oscillator 445 and mixer 440), may receive and convert to baseband a radio frequency input video signal transmitted on channel (or carrier) "a" from videophone apparatus $700_a$, while RF demodulator $275_b$, tuned to a radio frequency corresponding to channel "b", may receive and convert to baseband a radio frequency input video signal transmitted on channel (or carrier) "b" from videophone apparatus $700_b$, and so on. The various channels or carriers "a" through "n" are all at radio frequencies above the typical CATV spectrum, such as above 900 MHz, to avoid interference with downstream video, television, or other cable channels. For non-multiplexed input video signals, the video access apparatus may utilize the RF carrier detector and switch 276, to select which input video signal will be further transmitted to the network 140 (via primary station 105), potentially from among a plurality of input video signals (from each of the videophone apparatuses 700). In the event that more than one videophone apparatus 700 is transmitting a radio frequency input video signal to the video access apparatus 750, the RF carrier detector and switch 276 may, for example, select a particular channel (and corresponding videophone apparatus 700) on a contention basis, such as the first baseband input video signal to arrive at the RF carrier detector and switch 276, and transfer the baseband input video signal from that particular, selected channel to the audio/video compression and decompression subsystem 265, for further processing as discussed above with reference to FIGS. 3 through 9.

Figure 14:
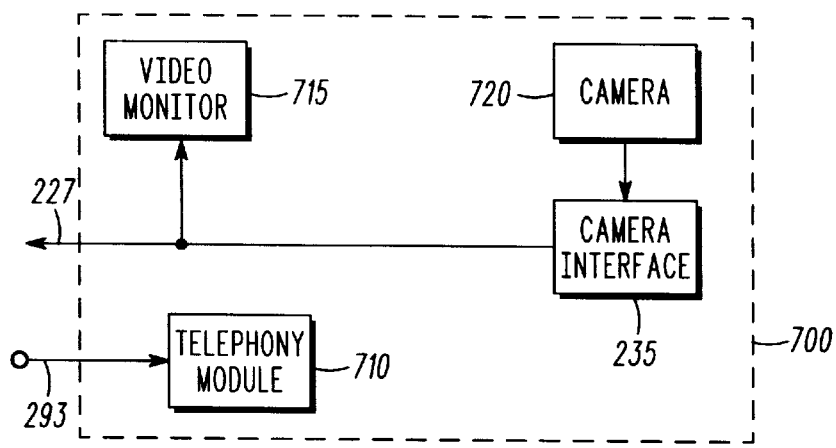
FIG. 14 is a detailed block diagram illustrating a first embodiment of a videophone apparatus 700 in accordance with the present invention.

FIG. 14 is a detailed block diagram illustrating a first embodiment of a videophone apparatus 700 in accordance with the present invention. As illustrated in FIG. 14, the first embodiment of the videophone apparatus, videophone apparatus 700, incorporates corresponding features or elements of the first embodiment of the video conferencing system 200 (or, equivalently, of the second embodiment of the video conferencing system 300), which features or elements operate and function as discussed above. These incorporated, corresponding features or elements include features such as the video display 225 (or television 240), audio 220 (or telephone 295), the camera interface 235, and the video camera 230. More specifically, referring to FIG. 14, the videophone apparatus comprises: first, a video monitor 715, such as a television receiver and display (having the same functions as either the video display 225 or television 240); second, a camera 720 (having the same functions as the video camera 230); third, a camera interface 235 (as illustrated in FIG. 10); and fourth, a telephony module 710 (having the same functions as the audio 220 or telephone 295). As indicated above, a videophone 700 (of the plurality of videophones 700) may transmit a radio frequency input video signal (on a particular channel or carrier) to the video access apparatus 750, via the second communication channel 227, originating from the camera interface 235 and the camera 720. As discussed above, the camera 720 video output, preferably modulated onto channel 3 or 4, is offset mixed by the camera interface 235 to an assigned channel or carrier, preferably having a frequency above typical CATV frequencies, such as in the 900 MHz to 1.2 GHz spectrum. Each of the plurality of videophones 700 may receive, via the video monitor 715, a radio frequency output video signal from the video access apparatus 750, via the second communication channel 227 and the primary station 105, originating from the network 140 or CATV services infrastructure 102. An audio signal may also be included within these video signals or, in the preferred embodiment, the audio signals (input and output) are transmitted and received independently via the telephony module 710 within the videophone apparatus 700, over the third communication channel 293. As discussed above concerning the telephones 295, in the preferred embodiment, video control is also provided via the telephony module 710, such as through user input (DTMF dialing). A videophone 700 may also include a directional coupler or splitter (not illustrated in FIG. 13) for connection or coupling of the radio frequency video signals to the second communication channel 227.

As indicated above, each of the various videophone apparatuses 700 may transmit a radio frequency input video signal to the video access apparatus 750, on an assigned channel or carrier of a plurality of channels or carriers, such as channel "a", channel "b", and so on. The assigned channel (or radio frequency carrier) may be assigned or otherwise determined through frequency selection via the oscillator 470 and mixer 465 of the camera interface illustrated in FIG. 10. Such a channel assignment may be set manually or downloaded at any time from the video access apparatus 750 via the second communication channel 227.

In the preferred embodiment, any of the videophone apparatuses 700 may receive a radio frequency output video signal (via the second communication channel 227), and may receive an output audio signal (via the third communication channel 293), both broadcast from the video access apparatus 750. As a consequence, any and all videophones 700 of the third embodiment of the video conferencing system 705 may display the output video and audio signals simultaneously. With regard to the radio frequency input video signal and input audio signal (transmitted to the video access apparatus 750), the input video signal originating from a particular camera 720 in a videophone 700 may be selected, as discussed above, through channel selection within the video access apparatus 750, utilizing a selecting means such as the RF carrier detector and switch 276. In addition, the input video signal originating from a particular camera 720 in a videophone 700 also may be selected by the user, via entry of a control signal (of a plurality of control signals) (discussed in greater detail below with reference to FIG. 15), or two or more input video signals originating from more than one particular camera 720 may be selected and multiplexed to create a combined, multiple video signal, for example, utilizing a window or a split screen format (discussed in greater detail below with reference to FIG. 16).

Figure 15:
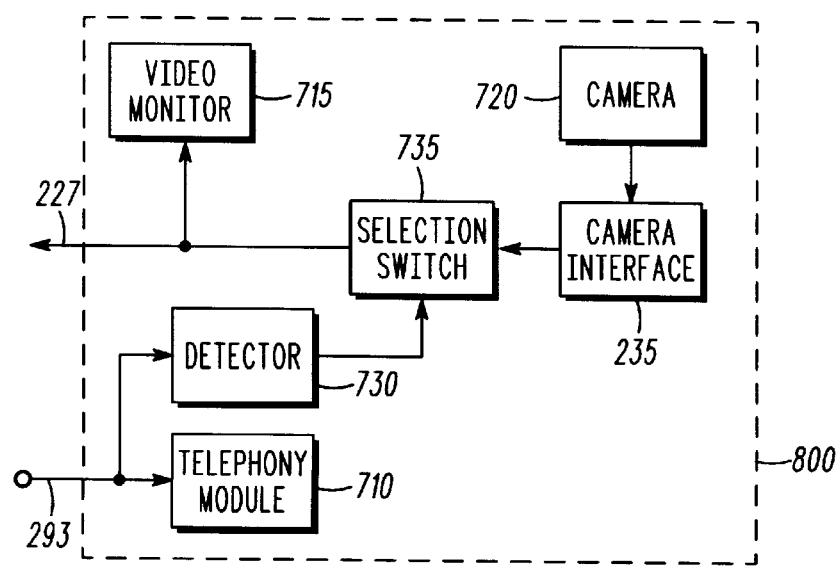
FIG. 15 is a detailed block diagram illustrating a second embodiment of a videophone apparatus 800 in accordance with the present invention.

FIG. 15 is a detailed block diagram illustrating a second embodiment of a videophone apparatus 800 in accordance with the present invention. As in the videophone apparatus 700 discussed above, the videophone apparatus 800 also includes a video monitor 715, a camera 720, a camera interface 235, and a telephony module 710. Like a videophone 700, a videophone 800 (of a plurality of videophones 800) also may transmit a radio frequency input video signal (on a particular channel or carrier) to the video access apparatus 750, via the second communication channel 227, originating from the camera interface 235 and the camera 720. As discussed above, the camera 720 video output, preferably modulated onto channel 3 or 4, is offset mixed by the camera interface 235 to an assigned channel or carrier, preferably having a frequency above typical CATV frequencies, such as in the 900 MHz to 1.2 GHz spectrum. Each of the plurality of videophones 800 may receive, via the video monitor 715, a radio frequency output video signal from the video access apparatus 750, via the second communication channel 227 and the primary station 105, originating from the network 140 or CATV services infrastructure 102. Also like the videophone 700, an audio signal may also be included within these video signals or, in the preferred embodiment, the audio signals (input and output) are transmitted and received independently via the telephony module 710 within the videophone apparatus 800, over the third communication channel 293. As discussed above concerning the telephones 295, in the preferred embodiment, video control is also provided via the telephony module 710, such as through user input (DTMF dialing).

As illustrated in FIG. 15, in the videophone apparatus 800, connected or coupled between the camera interface 235 and the second communication channel 227 is a selection switch 735, which is utilized to allow or prevent the input of a radio frequency input video signal, from the camera interface 235, into the second communication channel 227. The selection switch 735 is controlled through a detector 730, connected or coupled to the telephony module 710 and the third communication channel 293, which receives a control signal input by a user from any one of the telephony modules 710 of the plurality of videophones 800 coupled to the third communication channel 293. In the preferred embodiment, such control signaling is implemented utilizing DTMF dialing available in the telephony module. Alternatively, such control signaling may also be implemented utilizing other signaling or communications methods, such as frequency shift keying (FSK), or any of the other protocol or modulation methods discussed above. In addition to such signaling based or contention based control, as another alternative, such input control may be transparent to the user, for example, when the detector 730 and selection switch 735 are implemented utilizing speech detection, such as a voice operated switch (VOX), such that video is input automatically into the second communication channel 227 based upon whomever is speaking at that time.

Continuing to refer to FIG. 15, the videophone 800 which is to be the source of the input video signal (to the video access apparatus 750), of the plurality of videophones 800, is selected by the user through the telephony module 710, which is coupled via the third communication channel 293 to the user/audio interface 255 of the video access apparatus 750. In its simplest form, the detector 730 may simply detect which telephony module 710 or a particular videophone 800 (of the videophones 800) has gone off hook, and allows the selection switch 735 to allow or connect the input video signal from that off hook videophone 800. In the preferred embodiment, the user enters a predetermined DTMF sequence, such as a series of DTMF digits, to select the source videophone 800 which will provide the input video signal. In this implementation, all videophones 800 transmit a radio frequency input video signal on the same channel (RF carrier frequency), so that selection of a particular source videophone 800 avoids user contention and concomitant distortion which could result from simultaneous transmissions from multiple videophones 800, for example, when multiple videophones 800 have gone off hook. The DTMF sequence entered by the user is then utilized by the detector 730, via the selection switch 735, to enable or disable transmission of a radio frequency input video signal from a camera interface 235 (and camera 720) of any particular videophone 800. With this implementation, only a single RF demodulator 275 is required in the video access apparatus 750, as only one RF carrier is involved. The DTMF sequence entered by the user may also be utilized to automatically switch the video monitor 715 to the proper receive channel for reception of the radio frequency output video signal. In addition, when utilized with a camera interface 235 which may transmit on one or more assigned channels of a plurality of channels, for multiplexed radio frequency input video signals, the DTMF sequence may also be utilized to select which videophones 800 will be sources for the radio frequency input video signals. Such multiplexing is discussed below with reference to FIG. 16.

Figure 16:
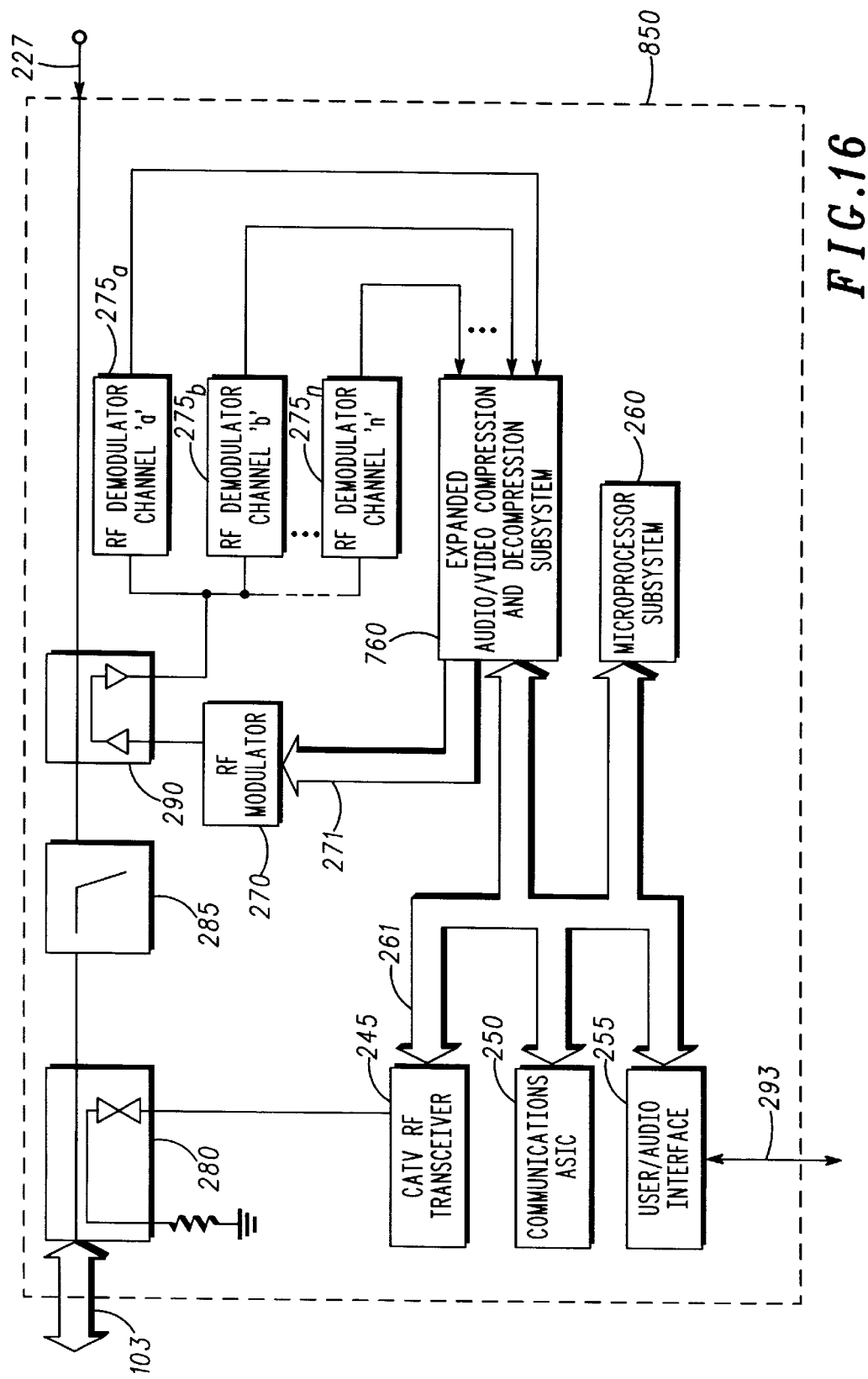
FIG. 16 is a detailed block diagram illustrating a fourth embodiment of a video access apparatus 850 in accordance with the present invention.

FIG. 16 is a detailed block diagram illustrating a fourth embodiment of a video access apparatus 850, in accordance with the present invention. The video access apparatus 850 is utilized, in the preferred embodiment, for multiplexing or combining a plurality of input video signals, from a plurality of videophones 700 or 800, into one combined video signal for subsequent transmission over the first communication channel 103. For example, four input video signals, from four videophones 700 or 800, may be combined in a two by two (2×2) format (four windows) into one video signal, before compression and transmission through the network 140. To accomplish such multiplexing or combining, in addition to having the plurality of RF demodulators $275_a$ through $275_n$, or the video access apparatus 700 discussed above with reference to FIG. 13, the video access apparatus 800 also has an expanded audio/video compression and decompression subsystem 760. The expanded audio/video compression and decompression subsystem 760, illustrated in FIG. 17, performs the same functions as the audio/video compression and decompression subsystem 265 discussed above, but is able to perform these functions for a greater number of channels, rather than for a single channel.

Figure 17:
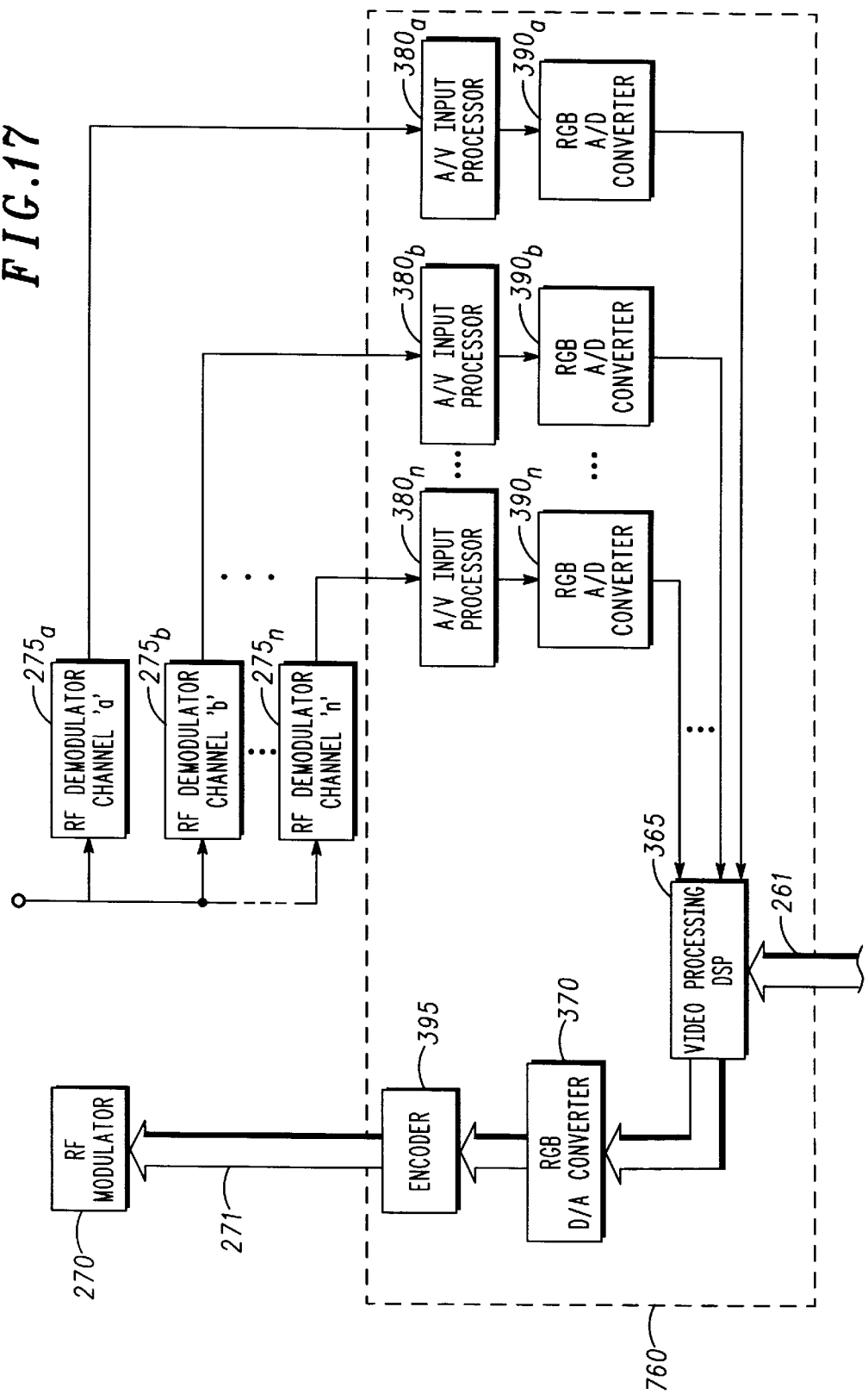
FIG. 17 is a block diagram illustrating an expanded audio/video compression and decompression subsystem 760 in accordance with the present invention.

FIG. 17 is a block diagram illustrating the expanded audio/video compression and decompression subsystem 760. The expanded audio/video compression and decompression subsystem 760 includes many of the same components as the audio/video compression and decompression subsystem 265, and further includes additional audio/visual input processors 380 and RGB analog to digital converters 390, to accomodate the additional video channels. As mentioned above with reference to FIG. 13, for each channel (or RF carrier), channels a through n, there is a corresponding RF demodulator 275, namely, RF demodulators $275_a$ through $275_n$. Referring to FIG. 17, the baseband input video signals from each of the RF demodulators $275_a$ through $275_n$, such as NTSC/PAL composite video signals, are fed or input into corresponding audio/visual input processors 380, namely, audio/visual input processor $380_a$ through audio/visual input processor $380_n$. As discussed above with reference to FIG. 6, the corresponding audio/visual input processors 380 convert the baseband input video signal, for each channel, into input analog RGB signals. The input analog RGB signals, for each channel a through n, are then converted into input digital RGB signals by corresponding RGB analog to digital converters 390, namely, RGB analog to digital converter $390_a$ through RGB analog to digital converter $390_n$, and transferred to the video processing DSP 365. The video processing DSP 365 combines or multiplexes the digital RGB signals from each channel, creating one combined video signal, which (with the audio from the user/audio interface 255) is then compressed and transferred to the communications ASIC 250 or microprocessor subsystem 260 for protocol encoding and modulation, for subsequent delivery to the network 140. For example, in the preferred embodiment, each channel typically contains video information having a common interface format (CIF); four such channels may be combined into one channel having four display windows utilizing a quarter common interface format (QCIF), before compression and transmission to the network 140.

Not illustrated in FIGS. 16 and 17, the video access apparatus 850 may also be expanded to provide for multiple output video channels, transmitting a plurality of radio frequency output video signals to a plurality of videophones via the second communication channel 227. In that event, the video access apparatus 850 illustrated in FIG. 16 would be expanded to include a plurality of modulators 270, such as a modulator $270_a$ for video transmission on channel "a", a modulator $270_b$ for video transmission on channel "b", and so on. Similarly, the expanded audio/video compression and decompression subsystem 760 would be further expanded to include, correspondingly, a plurality of encoders 395 and a plurality of RGB digital to analog converters 370, again corresponding to each output channel. With such additional expansion, the audio/video conferencing system 705 may support multiple and independent video conference sessions. In this multiple independent video mode, the input video signals would also be processed independently, rather than being combined into a single combined video signal. For example, videophone $700_1$ may communicate with remote location one and receive a video call on channel "a" while sending video on channel "b", while videophone $700_n$ may communicate with remote location two and independently receive a video call on channel "c" while independently sending video on channel "d". To support such multiple, independent video modes (also referred to as video bridging), the video access apparatus 850 may also include additional processing capability within the expanded audio/video compression and decompression subsystem 760, such as including a multipoint control unit (MCU) to provide processing support for such multiple independent video modes.

Figure 18:
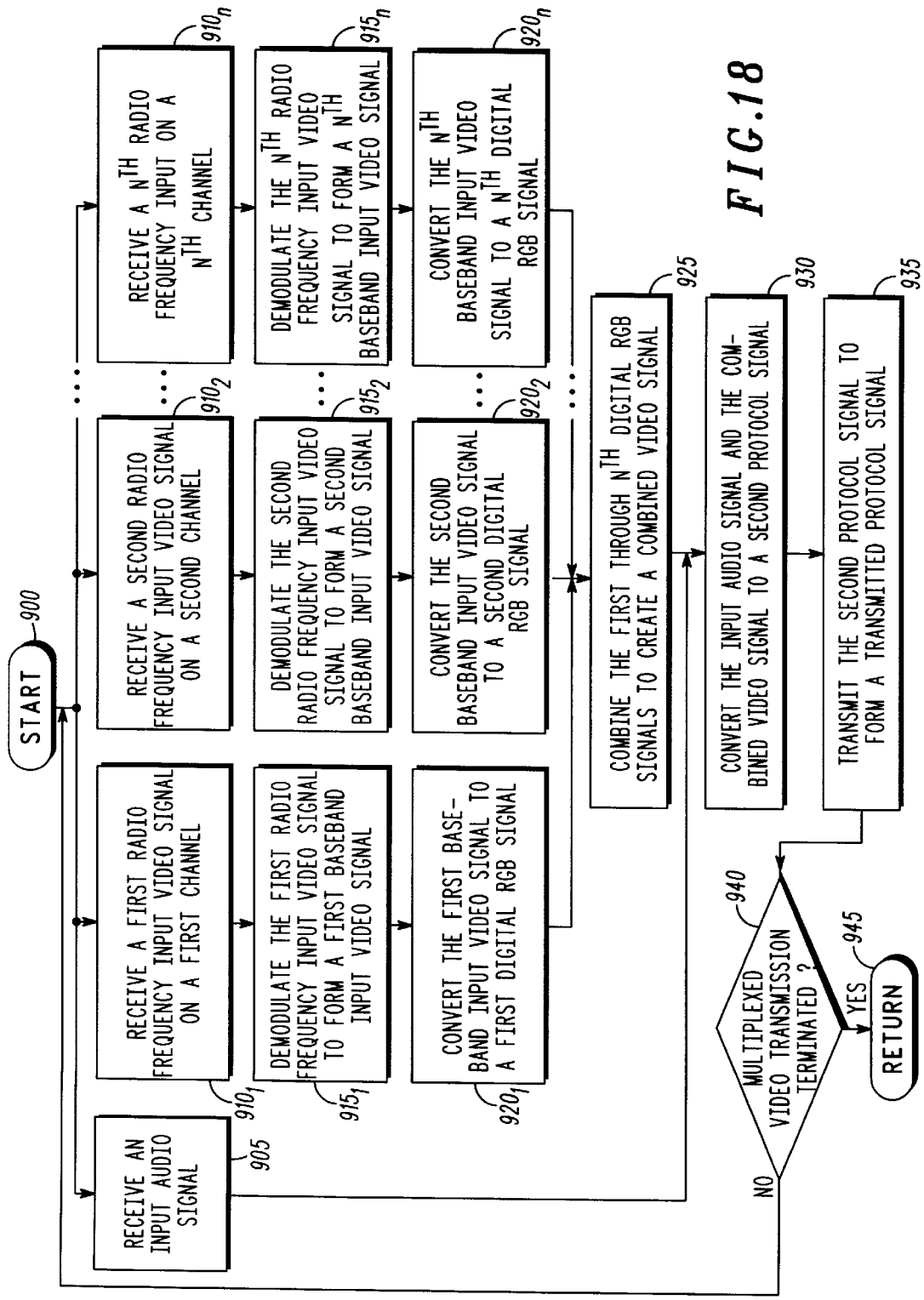
FIG. 18 is a flow diagram illustrating the video multiplexing method in accordance with the present invention.

FIG. 18 is a flow diagram illustrating the video multiplexing method in accordance with the present invention. As discussed above, this methodology concerns the video signal to be protocol encoded and transmitted over the first communication channel 103 to the network 104, and may be viewed as a special case or more narrow application of the method steps 510, 520, 530 and 540 discussed above with reference to FIG. 11. In addition, these mulitplexing, combining, encoding and transmission steps (discussed below, like steps 510, 520, 530 and 540, also may proceed concurrently with and independently of the video receiving (from the first communication channel 103 and the network 104), protocol decoding, RF modulating and transmitting steps 505, 515, 525 and 535 discussed above with reference to FIG. 11.

Referring to FIG. 18, the method begins, start step 900, with receiving an input audio signal, step 905, and with receiving a plurality of radio frequency input video signals, each carried on one of the plurality of channels a through n, namely, receiving a first radio frequency input video signal on a first channel, step $910_1$, receiving a second radio frequency input video signal on a second channel, step $910_2$, and so on, through receiving a $n^{th}$ radio frequency input video signal on a $n^{th}$ channel, step $910_n$. Next, each of the plurality of radio frequency input video signals is demodulated to form a plurality of baseband input video signals. More particularly, the first radio frequency input video signal is demodulated to form a first baseband input video signal, step $915_1$, the second radio frequency input video signal is demodulated to form a second baseband input video signal, step $915_2$, and so on, through the $n^{th}$ radio frequency input video signal being demodulated to form a $n^{th}$ baseband input video signal, step $915_n$. As indicated above, in the preferred embodiment, step 905 occcurs in the user/audio interface 255, with the receiving steps steps $910_1$ through $910_n$ and demodulating steps $915_1$ through $915_n$ occurring in the plurality of RF demodulators corresponding to each channel a through n, namely, RF demodulators $275_a$ through $275_n$.

Next, each of the plurality of baseband input video signals is converted to a digital RGB signal, such that the first baseband input video signal is converted to a first digital RGB signal, step $920_1$, the second baseband input video signal is converted to a second digital RGB signal, step $920_2$, and so on, through the $n^{th}$ baseband input video signal being converted to a $n^{th}$ digital RGB signal, step $920_n$. In the preferred embodiment, steps $920_1$ though $920_n$ occur, corresponding to each channel of the plurality of channels a through n, in the plurality of audio/visual input processors $380_a$ through $380_n$ and the plurality of RGB analog to digital converters $390_a$ through $390_n$. Next, the plurality of digital RGB signals, the first through $n^{th}$ digital RGB signals, are combined to create a combined video signal, step 925, which is preferrably performed by the video processing DSP 365. For example, four QCIF signals may be combined into one CIF signal. Next, in step 930, the combined video signal and the input audio signal are converted to a second protocol signal, such as a TDMA format signal, step 930, preferably by the processor arrangement 190, or by the microprocessor subsystem 260 and the communications ASIC 250, similarly to step 530 discussed above with reference to FIG. 11. In step 935, the second protocol signal is modulated and transmitted to form a transmitted protocol signal, such as a $\pi/4$-DQPSK TDMA signal (an upstream CACS signal), preferably by the video network interface 210 or the CATV RF transceiver 245, similarly to step 540 discussed above with reference to FIG. 11. Following step 935 (or also step 535), when the multiplexed video transmission (or video conference) has been terminated, step 940, such as by going on hook, the process may end, return step 945, and if the multiplexed video transmission (or video conference) has not been terminated in step 940, the method continues, returning to steps 905 and $910_1$ through $910_n$ (and step 505).

Numerous advantages from the various video access apparatuses 110, 150, 750 and 850, and from the various video conferencing systems 200, 300 and 705, are readily apparent. First, because the output video signal is modulated and transmitted over the second communications channel 227, such as over an entire coaxial cable within the user premises, the audio/visual conferencing and telephony system of the preferred embodiment may operate at more than one designated node or location within user premises, for example, utilizing any videophone, or telephone and television, within the user premises, providing multiple viewing points and multiple participation points. Such broadcast capability of the video conferencing functionality is truly unique to the invention disclosed herein and in the second related application. In addition, the audio/visual conferencing and telephony system of the preferred embodiment may be mobile, utilizing the video camera 230 and camera interface 235 from a myriad of locations within the user premises and, indeed, from anywhere the second communications channel 227 (such as a coaxial cable) may reach. As a consequence, the user is not confined to a single location, such as at a PC or in a dedicated conference room, for video conferencing capability. In addition, the system may be configured as needed for additional locations, for example, simply by adding or removing televisions and video cameras.

In addition, in accordance with the preferred embodiment, the audio/visual conferencing and telephony system utilizes equipment typically found in consumers' homes or premises, such as existing televisions, video cameras or camcorders, and telephones. As a consequence, the system may be implemented at relatively low cost, especially compared to the currently available PC-based or stand alone video conference systems. In addition, and in contrast with prior art video conferencing systems, the system of the present invention is designed to be compatible for use with other existing video conferencing systems, for example, those which may utilize ISDN networks. Use of the present invention is not limited to cable systems of current CATV systems, but may be utilized with connections to ISDN (H.320), POTS (H.324), and other systems such as T1 and E1 networks. Moreover, the system of the present invention is user friendly, easy to install and use, and should be relatively less expensive for in-home purchase and use by consumers.

Another interesting feature of the apparatus and system embodiments of the present invention is the multiple functionality of the user interface, for example, the dual use of a telephone (as a user interface) for control of the video conference call and for the audio portion of the video conference call. This feature is also in stark contrast to the prior art systems, which typically require special switching and special network operations for call placement and call control. Such duality is in addition to the concomitant use of the telephone for POTS service. Yet another significant feature of the preferred embodiment of the present invention is the transparency of telephony operation, such that a user need not be aware of the video conferencing capability to place or receive a telephone call.

Other special features of the preferred embodiment include dual network and premise powering of the video access apparatus, or complete network powering, enabling continued functionality even during power outages. Yet another significant feature of the present invention is the "loop back" operation, such that the same system may also be utilized for surveillance, such as baby monitoring, in addition to conferencing. With the multiplexing capability of the present invention, the video from multiple cameras may be looped back, for example, to provide simultaneous surveillance of multiple locations. Another significant feature of the present invention is the independence of the audio portion from the video portion of an audio/video conference. Moreover, the video conferencing capability illustrated is also protocol independent, such that other communication protocols may be utilized in lieu of or in addition to the CACS protocol of the preferred embodiment.

Lastly, the multiplexing capability of the various videophone apparatuses 700 and 800 is truly unique. In addition to providing the functionality discussed above, such as videoconferencing functionality from multiple locations, the various videophone apparatuses 700 and 800, in conjunction with video access apparatus 850, also provides for multiplexing and combining the video signals from multiple locations into one combined video signal which may be transmitted over a network or looped back into the user premises.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An audio and video conferencing system, the audio and video conferencing system coupleable to a communication channel for audio and video transmission and reception, the audio and video conferencing system comprising:

a plurality of videophone apparatuses, and a video access apparatus coupled to at least one of the videophone apparatuses having a user audio interface for receiving one or more of a plurality of user selectable audio control signals from the videophone apparatus, the plurality of audio control signals including a first audio control signal for selection of an audio/video conferencing mode of the audio and video conferencing system, the video access apparatus responsive to receive a corresponding plurality of radio frequency input video signals from the plurality of videophone apparatuses, and wherein the video access apparatus is further responsive to demodulate and combine the plurality of radio frequency input video signals to form a combined video signal.

2. The audio and video conferencing system of claim 1 wherein the video access apparatus is further responsive to convert the combined video signal and an input audio signal into a second protocol signal for transmission to a telecommunications network.

3. The audio and video conferencing system of claim 1 wherein a telephony mode of the audio and video conferencing system is transparently selected in the absence of the first control signal.

4. The audio and video conferencing system of claim 1 wherein the videophone apparatus is coupled to the video access apparatus for entry of a control signal of a plurality of control signals, for input of an input audio signal and for output of an output audio signal when the audio and video conferencing system is in an audio/video conference mode, and for telephony when the audio and video conferencing system is in a telephony mode.

5. An audio and video conferencing system, the audio and video conferencing system coupleable to a communication channel for audio and video transmission and reception, the audio and video conferencing system comprising:

a plurality of videophone apparatuses, and a video access apparatus coupled to at least one of the videophone apparatuses having a user audio interface for receiving one or more of a plurality of user selectable audio control signals from the videophone apparatus, the plurality of audio control signals including a first audio control signal for selection of an audio/video conferencing mode of the audio and video conferencing system, the video access apparatus responsive to receive a corresponding plurality of radio frequency input video signals from the plurality of videophone apparatuses, and wherein the video access apparatus is further responsive to separately demodulate and process the plurality of radio frequency input video signals as independent video signals.

6. A method, in a video access apparatus, including a video network interface coupled to a communication channel for communication with a remote apparatus, a processor arrangement coupled to the video network interface, a RF modulator and demodulator coupled to the processor arrangement, at least one video device coupled to the RF modulator and demodulator, and a telephone terminal coupled to the processor arrangement, the method comprising:

receiving one or more predetermined user selectable input signals from the telephone terminal and selectively entering, at the processor arrangement, a video conferencing mode in response to the signals; and establishing, at the processor arrangement, a video connection between the video device and the remote apparatus through the video network interface, together with a two-way audio connection between the telephone terminal and the remote apparatus through the video network interface.

7. The method of claim 6, wherein the predetermined signals are audio signals.

8. The method of claim 6, further comprising:

selectively entering, at the processor arrangement, a first or second mode in response to the signals;

when in the first mode, establishing, at the processor arrangement, a two-way telephone connection between the telephone terminal and the remote apparatus through the video network interface;

when in the second mode, establishing, at the processor arrangement, the video connection together with the two-way telephone connection.

9. The method of claim 8, wherein the first mode is entered by default upon occurrence of off-hook signal in the absence of the predetermined signals.

10. The method of claim 6, further comprises generating a speech prompt sequence in response to the predetermined signals.

11. The method of claim 6 wherein the video device is a video recording device.

12. The method of claim 6 further comprises controlling a plurality of video call control functions from the telephone terminal.

13. A method, in a video access apparatus, including a video network interface coupled to a communication channel for communication with a remote apparatus, a processor arrangement coupled to the video network interface, a plurality of RF modulators and demodulators coupled to the processor arrangement, at least one video device coupled to the plurality of RF modulators and demodulators, and a telephone terminal coupled to the processor arrangement, the method comprising:

receiving one or more predetermined user selectable input signals from the telephone terminal and selectively entering, at the processor arrangement, a video conferencing mode in response to the one or more signals;

selectively causing one of the plurality of RF modulators and demodulators to tune to a radio frequency corresponding to a selected channel and thereby to connect the at least one video device to the processor arrangement;

establishing, at the processor arrangement, a video connection between the video device and the remote apparatus through the video network interface, together with a two-way telephone connection between the telephone terminal and the remote apparatus through the video network interface.

14. The method of claim 13, wherein the predetermined signals are audio signals.

* * * * *